US012020534B2

(12) United States Patent
Haishima

(10) Patent No.: US 12,020,534 B2
(45) **Date of Patent: *Jun. 25, 2024**

(54) INFORMATION PROCESSING DEVICE, GAMING MACHINE, AND GAME SYSTEM

(71) Applicant: Universal Entertainment Corporation, Tokyo (JP)

(72) Inventor: Jun Haishima, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,460

(22) Filed: Jan. 27, 2023

(65) Prior Publication Data

US 2023/0177916 A1 Jun. 8, 2023

Related U.S. Application Data

(63) Continuation of application No. 17/289,317, filed as application No. PCT/JP2019/037526 on Sep. 25, 2019, now Pat. No. 11,594,099.

(30) Foreign Application Priority Data

Oct. 30, 2018 (JP) ................................ 2018-203901

(51) Int. Cl.
*G07F 17/32* (2006.01)

(52) U.S. Cl.
CPC ................................ *G07F 17/3227* (2013.01)

(58) Field of Classification Search
CPC ........... G07F 17/3227; A63F 5/04; A63F 9/00
See application file for complete search history.

*Primary Examiner* — Kevin Y Kim

(74) *Attorney, Agent, or Firm* — LEX IP MEISTER, PLLC

(57) ABSTRACT

An information processing device, a gaming machine and a game system can play a game on a rolling program in a gaming machine. The information processing device includes an information medium processing part for transmitting and receiving game value information that can be used in a game to and from a portable information medium, and an interface for transmitting and receiving information to and from the gaming machine. The information medium processing part reads out first game value information given on the condition of exchange for a monetary value, capable of being used to play the game, and limited in cash conversion from the information medium as the game value information, provides the first game value information to the game, and restricts writing the first game value information read out from the information medium into the information medium as second game value information that can be converted into cash.

16 Claims, 17 Drawing Sheets

1520

| | LIMITED | UNLIMITED |
|---|---|---|
| IN PRINCIPLE TREATED AS CASH EQUIVALENT | AR1 | AR2 |
| IN PRINCIPLE NOT TREATED AS CASH EQUIVALENT | AR3 | AR4 |

INFORMATION PROCESSING DEVICE, GAMING MACHINE, AND GAME SYSTEM

TECHNICAL FIELD

The present invention relates generally to a gaming machine installed in a game facility such as a casino and an information processing device provided to be communicable with the gaming machine.

BACKGROUND ART

In a related art, known is a slot machine that displays a plurality of symbols in a stopped state after displaying the plurality of symbols in a scrolled manner, and provides a game value (for example, a coin) based upon a combination of the symbols in the stopped state (refer to US-A-2012-0115571).

For example, in a game facility such as a casino including the slot machine, when a player participates in a program called a rolling program, in principle, the player can participate in a game with a game medium called a non-negotiation chip that cannot be converted into a currency. The rolling program is a program in which the player can receive a privilege such as a hotel ticket and an air ticket instead of depositing deposit money in the game facility such as the casino (refer to US-A-2012-0115571).

CITATION LIST

Patent Literature

PTL 1: US-A-2012-0115571

SUMMARY OF INVENTION

Technical Problem

Meanwhile, the rolling program is a program that is performed only in a game played on a game table in that a dedicated game chip called a non-negotiation chip is used, and is not operated by a gaming machine referred to as a so-called electronic gaming machine (EGM) such as a slot machine, and the like.

The non-negotiation chip is a chip that can be BET on the game and, in principle, cannot be directly converted into cash without a BET on the game.

The present invention has been made in consideration of the above-described circumstances, and an object thereof is to provide an information processing device capable of playing a game on a rolling program in a gaming machine, the gaming machine, and a game system.

Solution to Problems

An information processing device of the present invention connected to be able to transmit and receive information to and from a gaming machine capable of playing a game in response to an inserted game value, the device including: an information medium processing part capable of transmitting and receiving game value information that can be used in the game to and from a portable information medium; and an interface capable of transmitting and receiving information to and from the gaming machine, in which the information medium processing part reads out first game value information that is given on the condition of exchange for a monetary value, capable of being used to play the game, and limited in cash conversion from the information medium as the game value information, provides the read first game value information to the game, and restricts writing the first game value information read out from the information medium into the information medium as second game value information that can be converted into cash.

According to the configuration, first game value information that can be used to play the game and is limited in cash conversion is read out from the information medium and is provided to the game, and the first game value information read out from the information medium is restricted to being written into the information medium as second game value information that can be converted into cash, thereby making it possible to implement an information processing device capable of playing a game by a rolling program in the gaming machine capable of playing the game by using the information medium.

According to the configuration of the information processing device of the present invention, the information medium processing part writes information representing a prize amount generated as a result of the game into the information medium as the second game value information.

After using the first game value information that can be used for the game, the prize amount generated by the usage is written into the information medium as the second game value information that can be converted into cash, thereby making it possible to convert the first game value information into the second game value information that can be converted into cash via the game.

A gaming machine of the present invention capable of playing a game in response to an inserted game value, the machine including: a game execution part that executes the game; and an information medium processing part capable of transmitting and receiving a monetary value information to and from a portable information medium, in which the information medium processing part reads out first game value information that is given on the condition of exchange for a monetary value, capable of being used to play the game, and limited in cash conversion from the information medium as the game value information, provides the read first game value information to the game, and restricts writing the first game value information read out from the information medium into the information medium as second game value information that can be converted into cash.

According to the configuration, the first game value information capable of being used to play the game and limited in cash conversion is read out from the information medium and is provided to the game, and the first game value information read out from the information medium is restricted to being written into the information medium as the second game value information that can be converted into cash, thereby making it possible to play a game by a rolling program in the gaming machine playing the game by using the information medium.

A game system of the present invention, including: a gaming machine capable of playing a game in response to an inserted game value; and an information processing device connected to be able to transmit and receive information to and from the gaming machine, in which the gaming machine includes: a game execution part that executes the game; and an interface capable of transmitting and receiving information to and from the information processing device, and the information processing device includes: an information medium processing part capable of transmitting and receiving game value information that can be used in the game to and from a portable information medium; and an interface capable of transmitting and receiving information to and from the gaming machine, in which the information medium processing part reads out first game value information that is given on the condition of exchange for a monetary value, capable of being used to play the game, and limited in cash conversion from the information medium as the game value information, provides the read first game value information to the game, and restricts writing the first game value information read out from the information medium into the information medium as second game value information that can be converted into cash.

According to the configuration, the first game value information capable of being used to play the game and limited in cash conversion is read out from the information medium and is provided to the game, and the first game value information read out from the information medium is restricted to being written into the information medium as the second game value information that can be converted into cash, thereby making it possible to play a game by a rolling program in the game system playing the game by using the information medium.

Advantageous Effects of Invention

It is possible to provide an information processing device capable of playing a game on a rolling program in a gaming machine in the gaming machine, the gaming machine, and a game system.

DESCRIPTION OF EMBODIMENTS

[Overall Configuration]

Figure 1A:
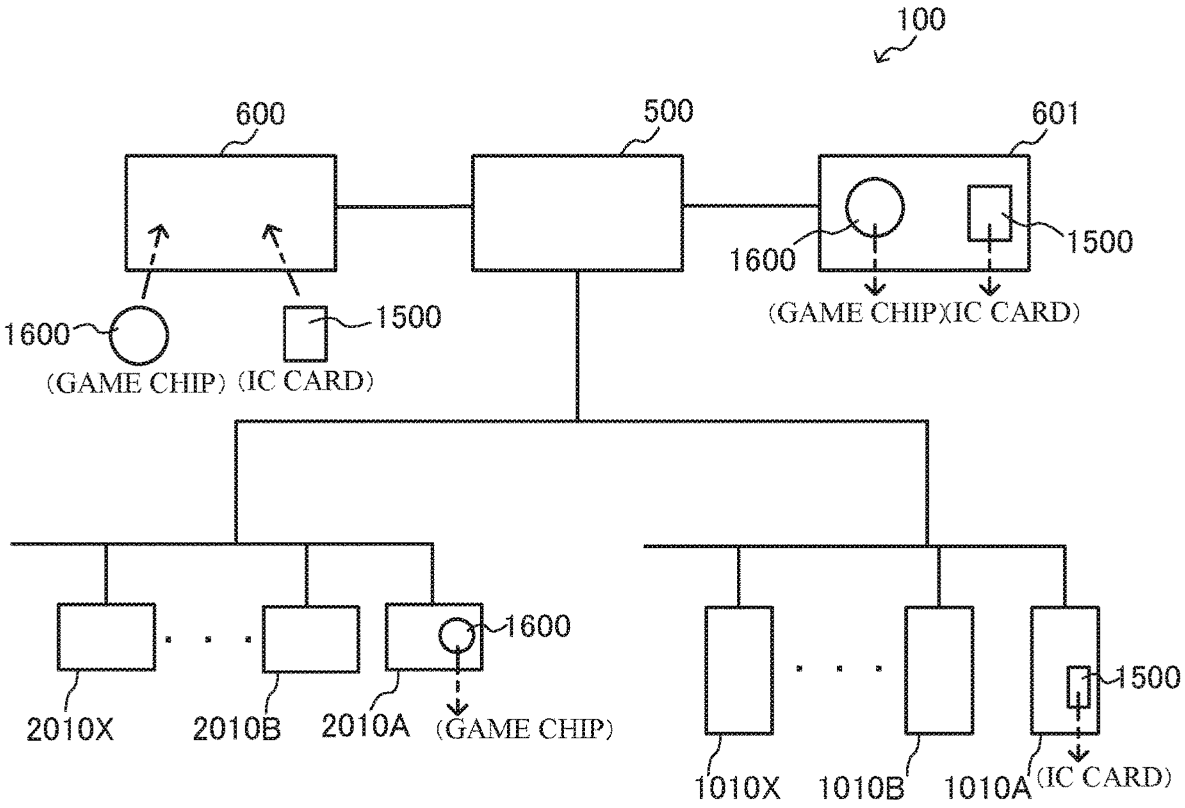
FIGS. 1A and 1B are diagrams illustrating an overall configuration of a casino system and a configuration of a hotel server according to an embodiment of the present invention.
Figure 1B:
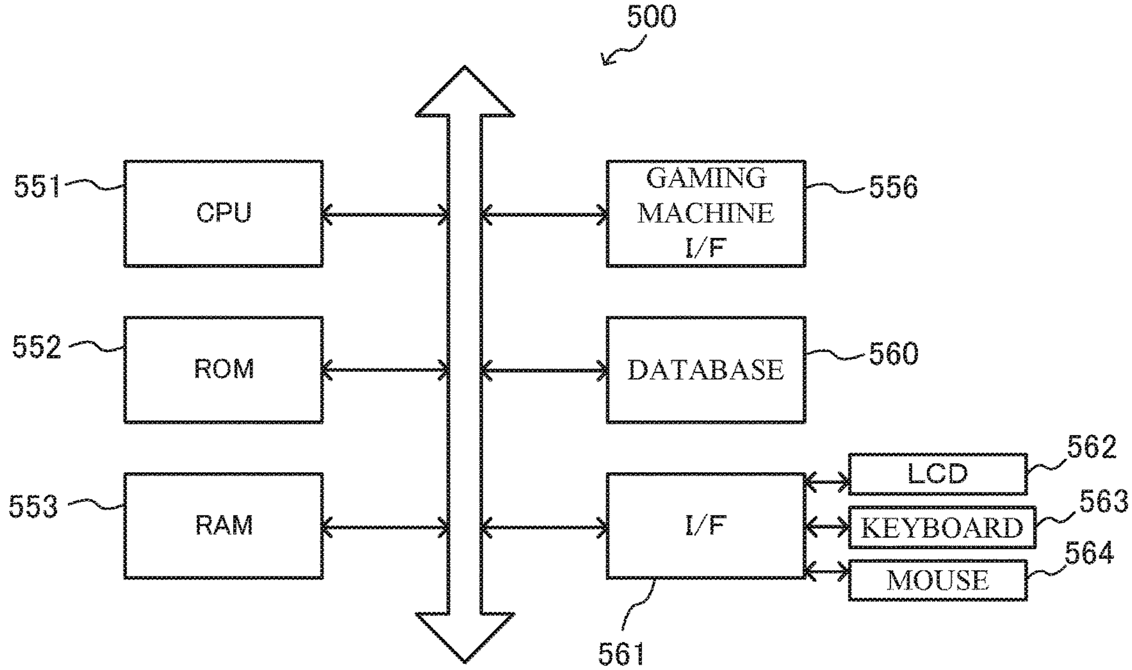

FIG. 1A is a block diagram illustrating a casino system 100 according to an embodiment of the present invention. As illustrated in FIGS. 1A and 1B, for example, the casino system 100 is formed of a plurality of gaming machines (for example, slot machines 1010A, 1010B, and the like) installed in game facilities such as a casino, and the like, a plurality of game tables (for example, game tables 2010A, 2010B, and the like), and a hotel server 500 communicably connected thereto in a bidirectional manner.

A device for issuing a member information card and a game chip 601 is connected to the hotel server 500, and in the device for issuing the member information card and the game chip 601, an IC card 1500 as an information medium is issued as the member information card and the game chip 1600 is issued. In the embodiment, a case where the IC card 1500 is used as the information medium to be used as the member information card or a non-member information card (which will be described later) is described, but the information medium is not limited thereto, and for example, a mobile terminal device such as a mobile phone, and the like may be used, in short, various devices and media that can read and write game value information can be used.

In the member information card, unique information card identification information (information card number (No)) for specifying the IC card 1500 is stored, and in the hotel server 500, member information is stored in a member database in association with each information card number. A player who becomes a member registers personal information (for example, name, address, telephone number, nationality, passport number, personal identification information for identifying an individual issued by a government, and the like) in the member database as the member information, thereby, in the member database, the personal information is registered in association with the information card identification information (information card number) for specifying the information card.

The information card to which the information card number is imparted is issued from the device for issuing the member information card and the game chip 601, and the issued information card is used when a player registered as a member plays a game in the slot machines 1010A, 1010B, and the like.

The game chip 1600 is issued from the device for issuing the member information card and the game chip 601, and is used when a game is played on the game tables 2010A, 2010B, and the like.

The hotel server 500 is connected to a cashier 600 for performing cash conversion based upon the IC card 1500 (member information card, non-member information card) or the game chip.

After the game, a player playing a game by using the IC card 1500 as the member information card or the non-member information card (described later) inserts the IC card 1500 paid out from the slot machines 1010A, 1010B, and the like into a card reader of the cashier 600, such that a currency corresponding to the balance owned by the player stored the information card identification information (information card number) of the IC card 1500 is paid out to the player. In the embodiment, information on the balance associated with the information card is written directly to the IC card 1500, but the present invention is not limited thereto. For example, the hotel server 500 may store the balance information in association with the information card number. Here, the balance information being stored in the memory of the hotel server 500 may be read out corresponding to the card number of the IC card 1500 read by the card reader of the cashier 600, after which the currency may be paid back based upon the read balance information.

In the IC card 1500 (member information card and nonmember information card), four types of game value storage areas are provided as game value information indicating an amount of the game value respectively provided for the BET of a game. Specifically, the four types of game value storage areas include: a first storage area AR1 for storing a first game value which is credited as cash and is permitted to be used only in the game; a second storage area AR2 for storing a second game value which is credited as cash and can be converted into cash without playing the game; a third storage area AR3 for storing a third game value which is credited as a game value other than cash, cannot be basically converted into cash, and is permitted to be used only in the game; and a fourth storage area AR4 for storing a fourth game value which is credited as a game value other than cash, cannot be basically converted into cash, and is permitted to be used not only for the game but also for various services in the facility (so-called bonus credit). Hereinafter, information representing the type and the amount of the game value stored in the first storage area AR1 will be referred to as first game value information; information representing the type and the amount of the game value stored in the second storage area AR2 will be referred to as second game value information; information representing the type and the amount of the game value stored in the third storage area AR3 will be referred to as third game value information; and information representing the type and the amount of the game value stored in the fourth storage area AR4 will be referred to as fourth game value information. The pieces of game value information written in the information card will be collectively referred to as the balance information.

In the non-member information card of the IC card 1500, a player who is not registered as a member first inserts a currency into the slot machines 1010A, 1010B, and the like and plays a game, after which a dividend (prize money) provided to the player as a result of the game and an amount corresponding to the number of credits remaining after making a BET with respect to an inserted amount are written into the non-member information card (IC card 1500), and the non-member information card is newly paid out from the slot machines 1010A, 1010B, and the like in which the play is performed. The player inserts the newly paid-out non-member information card (IC card 1500) into other slot machines 1010A, 1010B, and the like, thereby a new game can be played by using the number of credits corresponding to the balance information written into the non-member information card. When the non-member information card (IC card 1500) is inserted into the slot machines 1010A, 1010B, and the like and thus a game is played, a game value based upon the number of credits such as the dividend (prize money) given as a result of the game play is written into the non-member information card (IC card 1500) inserted into the slot machines 1010A, 1010B, and the like when the game is played as the balance information. That is, the balance information of the non-member information card is updated and the non-member information card is paid out. Accordingly, a player who is not registered as a member can play a game in the plurality of slot machines 1010A, 1010B, and the like while using one non-member information card.

Even when the inserted IC card 1500 is the member information card issued to the player registered as the member, the balance information is updated and paid out with respect to the inserted member information card in the same manner as that of the non-member information card.

When a player playing a game on the game tables 2010A, 2010B, and the like by using a game chip presents the game chip 1600 as a dividend (prize money) received from a dealer after the game to the cashier 202, a currency corresponding to the game chip can be received.

In the embodiment, the balance information associated with the information card is directly written into the IC card 1500, but is not limited thereto, and for example, the hotel server 500 may store the balance information in association with the information card number. Here, the balance information being stored in the memory of the hotel server 500 may be read out corresponding to the card number of the IC card 1500 read by the card reader of the cashier 600, and the currency may be paid back based thereupon.

FIG. 1B is a block diagram illustrating a configuration of the hotel server 500. As illustrated in FIG. 1B, the hotel server 500 includes a configuration in which a central processing unit (CPU) 551, a read only memory (ROM) 552, a random access memory (RAM) 553, a gaming machine I/F 556, a database 560, an I/F 561, and the like are connected to a bus, and a liquid crystal display (LCD) 562, a keyboard 563, a mouse 564, and the like are connected to the bus via the I/F 561. In the database 560, the member information associated with the information card number, the balance information and the game history information associated with the IC card 1500 issued to a game value member being stored in the information card, the balance information and the game history information associated with the IC card 1500 issued to the non-member, and the like are stored.

[Rolling Program]

Next, a rolling program to be adopted in the embodiment will be described. The rolling program is a service in which a player can receive a privilege called a gift such as a free voucher for an accommodation fee, an airline ticket, and the like instead of depositing a predetermined amount of deposit money in a game hall such as a casino. Specifically, when depositing the predetermined amount of deposit money in a game facility such as the casino as the deposit money, the player can receive a game medium called a non-negotiation chip (rolling chip) that cannot be converted into cash and thus can play a game by using the non-negotiation chip.

[Overall Configuration of Slot Machine]

Figure 2:
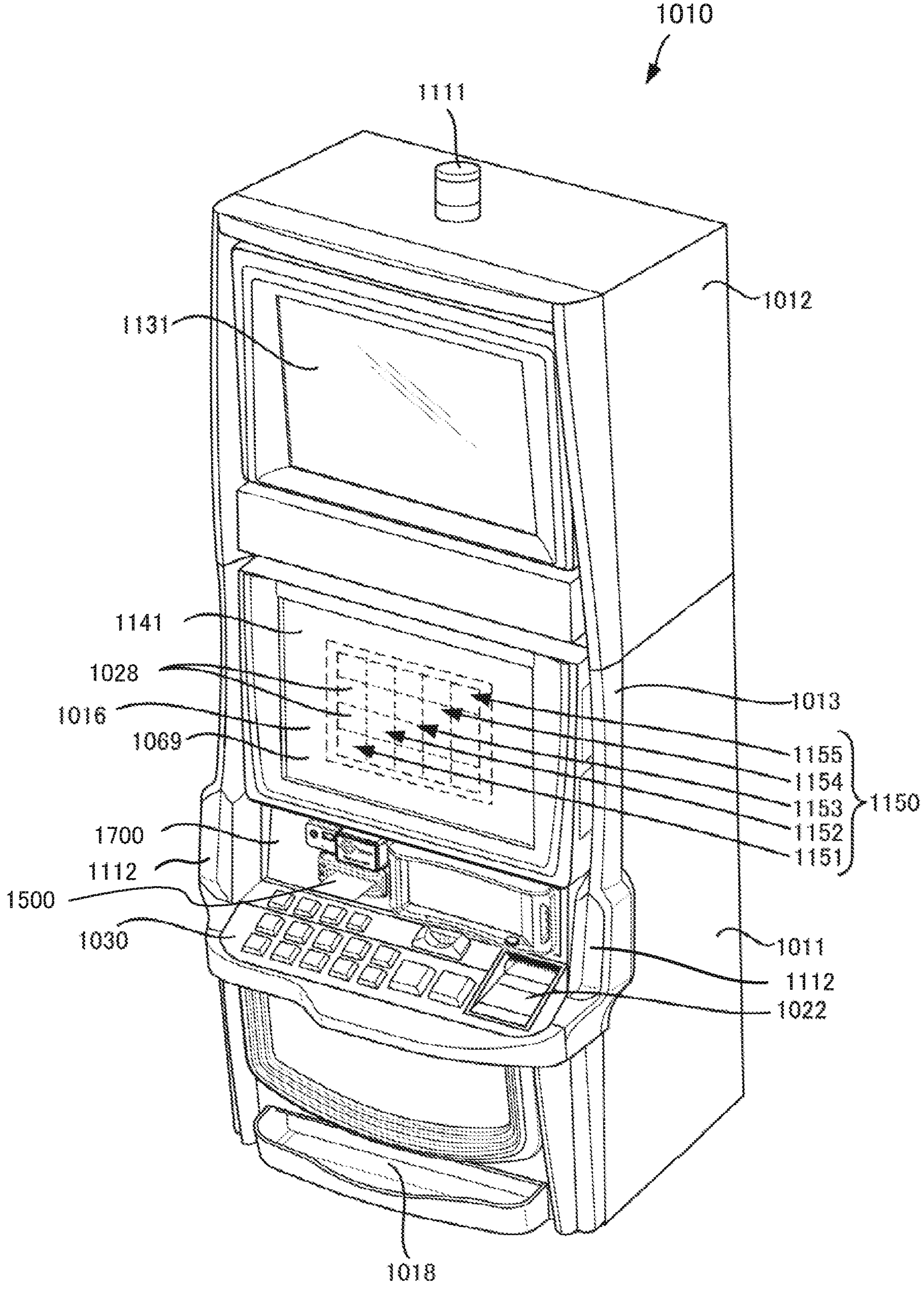
FIG. 2 is a perspective view illustrating a configuration of a slot machine according to an embodiment of the present invention.

Next, an overall configuration of the slot machines 1010A, 1010B, and the like (hereinafter referred to as a slot machine 1010) will be described with reference to FIG. 2.

In the slot machine 1010, as the game medium, the member information card (IC card 1500), the non-member information card (IC card 1500), a bill, or electronic valuable information corresponding to the game values thereof are used. Particularly, in the embodiment, credit-related data such as cash data, and the like stored in the member information card or the non-member information card (hereinafter referred to as the IC card 1500) are used.

The slot machine 1010 includes a cabinet 1011, a top box 1012 installed on the upper side of the cabinet 1011, and a main door 1013 provided on the front surface of the cabinet 1011.

The main door 1013 includes a symbol display device 1016 referred to as a lower image display panel 1141. The symbol display device 1016 is formed of a transparent liquid crystal panel. In the screen on which the symbol display device 1016 is displayed, a display window 1150 is provided in a central part thereof. The display window 1150 is formed of 20 pieces of display blocks 1028 in five columns and four rows. The four pieces of display blocks 1028 in each column form pseudo reels 1151 to 1155 and are rotated according to an operation of a player. Each of the pseudo reels 1151 to 1155 can be rearranged in such a manner that the four pieces of display blocks 1028 are moved and displayed in a downward direction while changing the speed as a whole such that a symbol displayed on each of the display blocks 1028 is rotated in a vertical direction and then is stopped.

Here, the "rearrangement" means a state in which the symbol is arranged again after the arrangement of the symbol is released. The "arrangement" means that the symbol is in a state of being visually confirmable by an external player. The slot machine 1010 executes a so-called slot game in which a dividend corresponding to a winning combination is provided depending on the arrangement state of the symbol based upon the stop state of the rotating pseudo reels 1151 to 1155.

In the embodiment, it is described that the slot machine 1010 is a so-called video slot machine, but the slot machine 1010 of the present invention may adopt a so-called mechanical reel or may be substituted for some of the pseudo reels 1151 to 1155.

A touch panel 1069 is provided on the front surface of the symbol display device 1016, and a player can input various instructions by operating the touch panel 1069. An input signal is transmitted from the touch panel 1069 to a main CPU 1071.

An upper image display panel 1131 is provided on the front surface of the top box 1012. The upper image display panel 1131 is formed of a liquid crystal panel and forms a display. The upper image display panel 1131 displays an image relating to a performance, an image showing an introduction of the contents of the game and the description of a rule. The top box 1012 is provided with a lamp 1111.

A number-of-credits display part (not illustrated) is displayed at the upper part of the display window 1150, and the current number of credits is displayed thereon. Here, the "credit" is a virtual game medium on a game used when a player makes a BET. The total number of credits currently owned by the player is displayed on the number-of-credits display part.

A fractional cash display part (not illustrated) is displayed at the lower part of the number-of-credits display part. The fractional cash display part displays fractional cash. The "fractional cash" means cash that is not converted into the credit because the inserted amount is not sufficient.

The IC card 1500 is inserted into the PTS terminal 1700 which will be described later; the number of credits stored in the IC card 1500 is displayed on the number-of-credits display part; and the fractional cash stored in the IC card 1500 is displayed on the fractional cash display part. The numerical values are stored in the hotel server 500 in association with an identification code of a membership card.

Here, the IC card 1500 is a non-contact IC card and incorporates an integrated circuit (IC) for recording and computing various data such as a credit, and the like, and is capable of performing, for example, short-range radio communication using radio frequency identification (RFID) technology such as near field communication (NFD). The player can own the credit related data by using the IC card 1500 and can freely carry the IC card 1500 between different slot machines. Then, the IC card 1500 is inserted into the PTS terminal 1700 of the slot machine 1010, thereby the player can play a game such as a unit game, and the like in the slot machine 1010 by using the credit related data (amount data) stored in the IC card 1500.

The player can store cash such as a coin and a bill in the IC card 1500 as cash data from a machine installed in the hall.

At the lower part of the lower image display panel 1141, the PTS terminal 1700 is incorporated in the cabinet 1011. Speakers 1112 are respectively provided on the left and right sides of the PTS terminal 1700 and the lamp 1111 is provided at the upper part of the top box 1012. In the slot machine 1010, the performance of the unit game is executed by the display of an image by the upper image display panel 1131, the output of sound by the speaker 1112, and the output of light by the lamp 1111. The PTS terminal 1700 is provided in the slot machine 1010 as accessory or internally.

[Internal Configuration Provided in Slot Machine]

Figure 3:
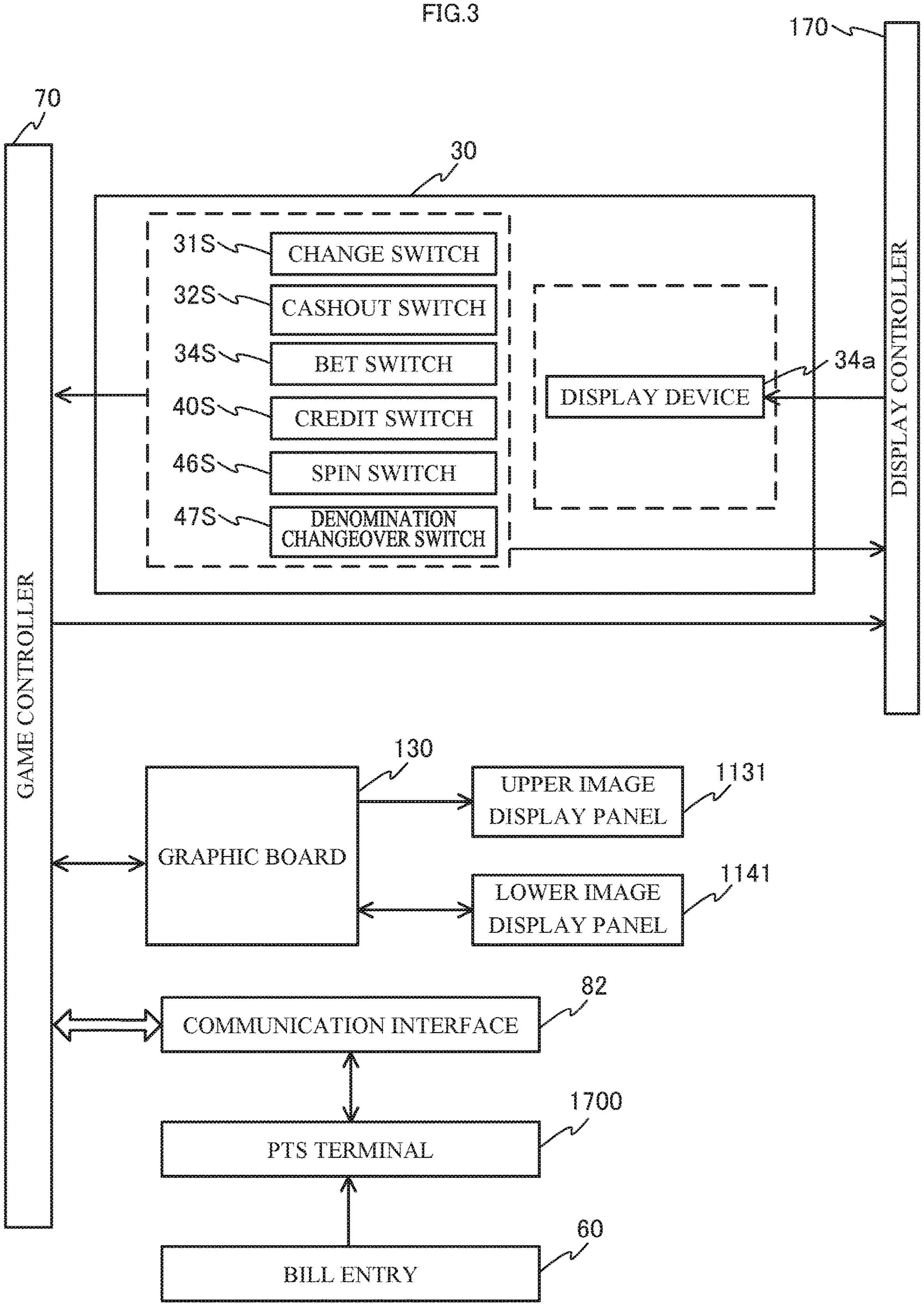
FIG. 3 is a block diagram illustrating an internal configuration of the slot machine according to the embodiment of the present invention.

Next, an internal configuration of the slot machine 1010 and a control panel 30 provided in the slot machine 1010 will be described with reference to FIG. 3.

A game controller 70 is provided on a circuit substrate for a game inside the slot machine 1010. A display controller 170 is provided on a circuit substrate for a control panel different from the circuit substrate for the game of the game controller 70 inside the control panel. The game controller 70 and the display controller 170 respectively include: a CPU provided on the circuit substrate for the game and the circuit substrate for the control panel; an electrically erasable and programmable read only memory (EEPROM) for storing programs executed by the CPU and data used for the programs for rewriting to be capable; and a random access memory (RAM) for temporarily storing data when executing the program. The game controller 70 and the display controller 170 are configured in cooperation with the hardware and the software in the storage device described above. The display controller 170 is not limited to being provided separately from the game controller 70, and the game controller 70 may include the function of the display controller 170.

For example, the storage device of the game controller 70 stores the data and the programs used when the CPU operates. For example, when the game controller 70 performs the fetching processing of the above-described game program, game system program, and authentication program from an external storage device, the game controller 70 can store the programs. The storage device of the game controller 70 is provided with a work area used when the programs are executed. For example, an area for storing the number of times of games, the number of BETs, the number of payouts, the number of credits, and the like, and an area for storing symbols (code numbers) determined by lottery are provided.

As described above, the game controller 70 executes the game and controls the symbol display device 1016 so as to rearrange symbols corresponding to the game. As described above, the game controller 70 validates a valid line of the number corresponding to a credit button (not illustrated) that receives an input in a display frame of three rows and five columns formed of a plurality of blocks, and when the same type of symbols of a predetermined number or more are rearranged in the validated valid line, a line dividend corresponding to the type of symbols is awarded. That is, the game controller 70 is configured to control the slot machine by causing the CPU to execute the game program and the game system program in the storage device. The display controller 170 includes a graphic board and displays a bet amount required for a display device (not illustrated) of the credit button.

The control panel 30 is provided with a CHANGE switch 31S, a CASHOUT switch 32S, a BET switch 34S, a credit switch 40S, a spin switch 46S, and a denomination changeover switch 47S corresponding to the above-described respective buttons. Each switch detects that the corresponding button is pressed by a player and outputs a signal to the game controller 70 and the display controller 170. The game controller 70 controls the bet based on the signals from the respective switches. The display controller 170 transmits the signals from the respective switches to the game controller 70, and the game controller 70 determines contents to be displayed on the display device provided with the button based on the signals, and transmits a determination result to the display controller 170, thereby the determination result is displayed on each button.

The game controller 70 is connected to a graphic board 130, a power supply unit 81, and a communication interface 82 in addition to the speaker, the touch panel, and the like.

The graphic board 130 controls the display of the images respectively performed by the upper image display panel 1131 and the lower image display panel 1141 based upon the control signal outputted from the game controller 70. The graphic board 130 includes a VDP for generating image data and a video RAM for storing the image data generated by the VDP.

The graphic board 130 includes the video display processor (VDP) for generating the image data based upon the control signal outputted from the game controller 70 and the video RAM for temporarily storing the image data generated by the VDP. The image data used when generating the image data by the VDP are included in the game program of the storage device. The graphic board 130 includes a function of outputting the operation results of various touch icons provided on the lower image display panel 141 to the game controller 70.

The communication interface 82 performs communication with the PTS device 1700 and an external control device. When receiving an input signal from a bill entry 60, the PTS device 1700 transmits inserted currency information included in the input signal to the game controller 70 via the communication interface 82. When the IC card is inserted into the card insertion slot, the PTS device 1700 transmits the balance information stored in the IC card to the game controller 70 via the communication interface 82. The PTS device 1700 writes credit data to the IC card inserted into the card insertion slot based upon the control signal received from the game controller 70 via the communication interface 82.

The game controller 70 can transmit a signal to the display controller 170 by using a known communication protocol and communication connection. For example, the game controller 70 transmits a signal indicating whether the current state is a reception permission state of various buttons to the display controller 170.

[Configuration of PTS Device]

Figure 4:
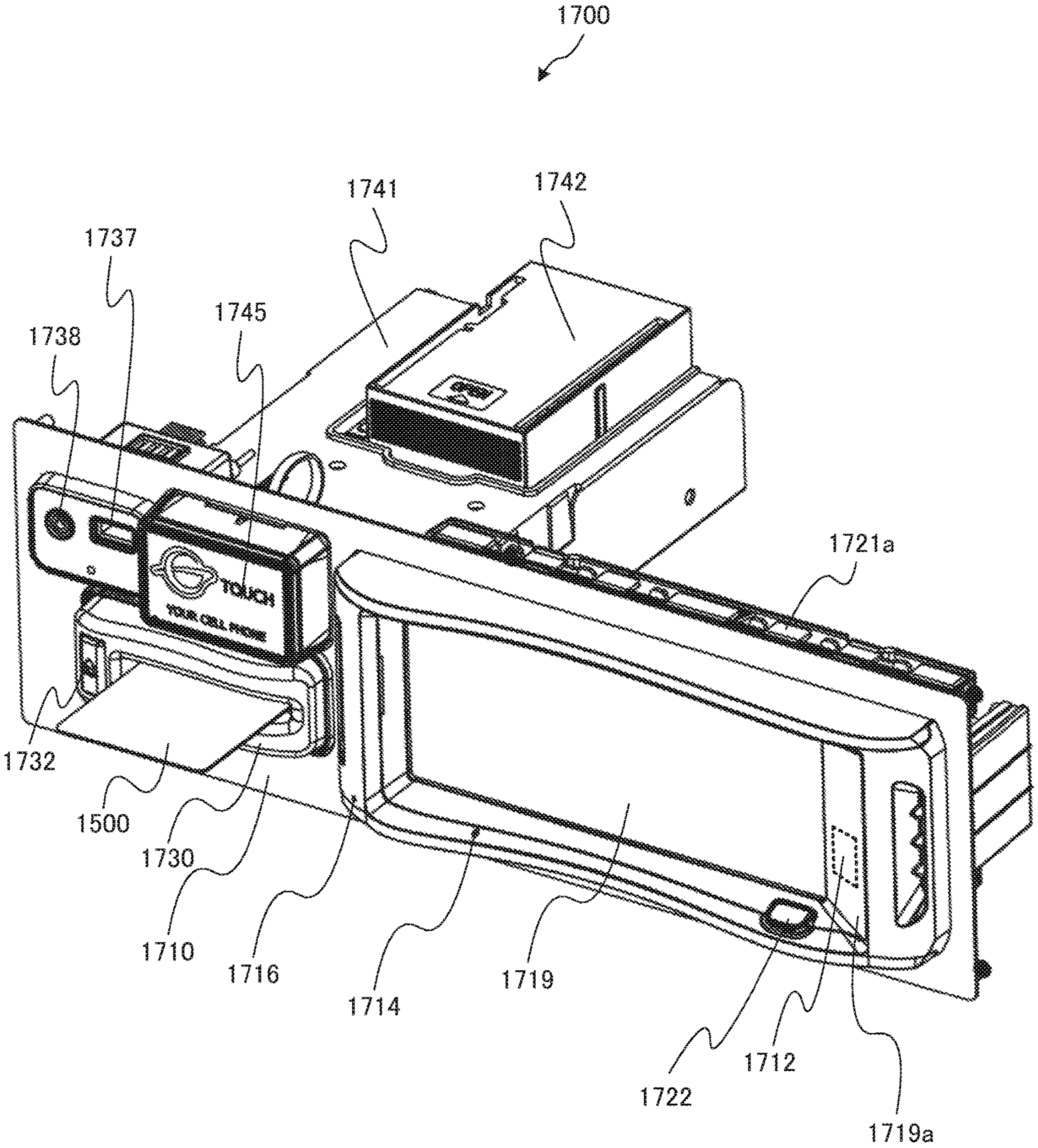
FIG. 4 is a perspective view illustrating a PTS terminal incorporated in the slot machine according to the embodiment of the present invention.

FIG. 4 is a diagram illustrating the PTS device 1700 incorporated in the slot machine 1010. The PTS device 1700 can be incorporated into various types of gaming machines of various manufacturers by performing data exchange by using a data interface common between the gaming machines.

The PTS device 1700 includes a panel 1710; each part disposed on the front surface of the panel 1710 is visually recognized by the player; and a member disposed on the rear surface of the panel 1710 is stored inside the slot machine 1010 such that the member cannot be seen by the player.

An LCD 1719 including a touch panel function is provided on the right side of the front surface of the panel 1710. The LCD 1719 displays, for example, information on the member and information for the member, and a screen size is 6.2 inches (about 15.7 cm). An LCD cover 1719*a* is provided around the LCD 1719. In the example, the LCD 1719 is configured to include the touch panel function, but the instruction of the player may be inputted by another input device such as a keyboard and a mouse.

A full color LED 1721*a* and a full color LED 1721*b* (FIG. 5) are configured to be capable of performing light emission contributing to a warning of a fraudulent act.

An imaging window 1712 is provided on the right side of the LCD 1719, and a human body detection camera disposed inside the LCD cover 1719*a* captures an image of the player, and the like through the imaging window 1712. The imaging window 1712 may be, for example, a half mirror material to which shield processing such as smoke, and the like is applied.

A card insertion slot 1730 into and from which the IC card 1500 can be inserted and removed is provided at the lower left and front surface of the panel 1710. A card insertion part of the card insertion slot 1730 is provided with a full color LED 1731 (refer to FIG. 5), and it is possible to notify the remaining number of IC cards 1500 accumulated in a card stacker 1742 which will be described later by lighting in a plurality of colors. The card insertion slot 1730 is provided with an eject button 1732, and a red LED 1733 (refer to FIG. 5) provided near the eject button 1732 is turned on so that a position of the eject button 1732 and processing of an eject operation can be understood.

A card unit 1741 and a card stacker 1742 are provided at a position on the back side of the panel 1710 corresponding to the card insertion slot 1730, and the card insertion slot 1730 is configured as a part of the card unit 1741. About 30 pieces of IC cards 1500 can be stored in the card stacker 1742, and when a non-member player who newly plays a unit game settles a credit, the IC card 1500 stored in the card stacker 1742 is taken out and discharged to the card insertion slot 1730 as the non-member information card. That is, when the game is played with a currency inserted into the bill entry 60 without inserting the IC card 1500 from the card insertion slot 1730, the IC card 1500 is discharged from the card insertion slot 1730 as the non-member information card in a state of being not associated with the personal information of the member database.

On the other hand, when the member information card (IC card 1500) associated with the personal information of the player in advance is inserted from the card insertion slot 1730, or when the non-member information card (IC card 1500) that is not associated with the personal information is inserted from the card insertion slot 1730, the inserted IC card 1500 is held in the card unit 1741, and information such as the balance information which is a result of the game in the slot machine 1010 is written into the held IC card 1500 when the card is discharged.

The member information card or the non-member information card (IC card 1500) held in the card unit 1741 updates credit information (storage information in the first to fourth storage areas AR1 to AR4) by an NFC, and the like at the time of settlement of the credit when the CASHOUT button is operated, after which the IC card 1500 is discharged from the card insertion slot 1730. The IC card 1500 is completely stored inside the card unit 1741 while the player plays the unit game.

When the absence of the player is detected by the human body detection camera, and the like even though the IC card 1500 remains at the time of the settlement of the credit, the IC card 1500 can be configured to be stored in the card stacker 1742. Accordingly, for example, when the player leaves the IC card 1500 and leaves his or her seat after knowing that the remaining credit is low, or even when the player simply forgets to take the IC card 1500 and leaves the seat, the IC card 1500 does not remain held in the card unit 1741 for a long time.

A USB terminal 1737 and an audio terminal 1738 are provided on the front upper left side of the panel 1710. The USB terminal 1737 is configured to perform charging, and the like by connecting a USB device to the USB terminal 1737. The audio terminal 1738 is, for example, a four-pole terminal, and a headset is inserted thereinto, such that the user can talk to the other party with a headphone and a microphone. The audio terminal 1738 is configured as a two-pole or a three-pole terminal such that the user also can listen to the sound with the headphone.

A touch unit 1745 is provided on the front surface of the panel 1710 and on the left side of the LCD 1719. The touch unit 1745 includes, as the information medium, a writer that writes data by data communication to an IC device including an IC chip (for example, a non-contact IC card and a mobile phone and a smart phone provided with a communication function by the NFC); and an RFID module that can function as a reader that reads the data from the IC device by the data communication. LEDs 1746 (not illustrated) are respectively disposed at four corners of the front surface of the touch unit 1745. In addition to the touch unit 1745, or in place of the touch unit 1745, an information recording medium reader for reading information stored in an information recording medium such as a magnetic card may be provided. Here, the magnetic card can be used as a member card instead of the IC card 1500.

As described above, in the PTS device 1700 according to the embodiment of the present invention, various devices including a microphone function, a camera function, a speaker function, a display function, and the like are integrated to form one unit, thereby achieving space saving. Accordingly, for example, when the LCD is directed toward the player in a state where each of the functions is installed as a single part, there is no inconvenience that the speaker cannot be installed toward the player.

In the PTS device 1700 according to the embodiment of the present invention, when the IC card 1500 is inserted into the card insertion slot 1730, the contents of the IC card 1500 are configured to be read by the card unit 1741 and the entire IC card 1500 is configured to be taken in and held (inside the PTS device 1700), however, in addition thereto, the touch unit 1745 is provided, thereby making it possible to further perform the data communication with another IC card, a mobile phone, and a smart phone.

[Internal Configuration of PTS Device]

Figure 5:
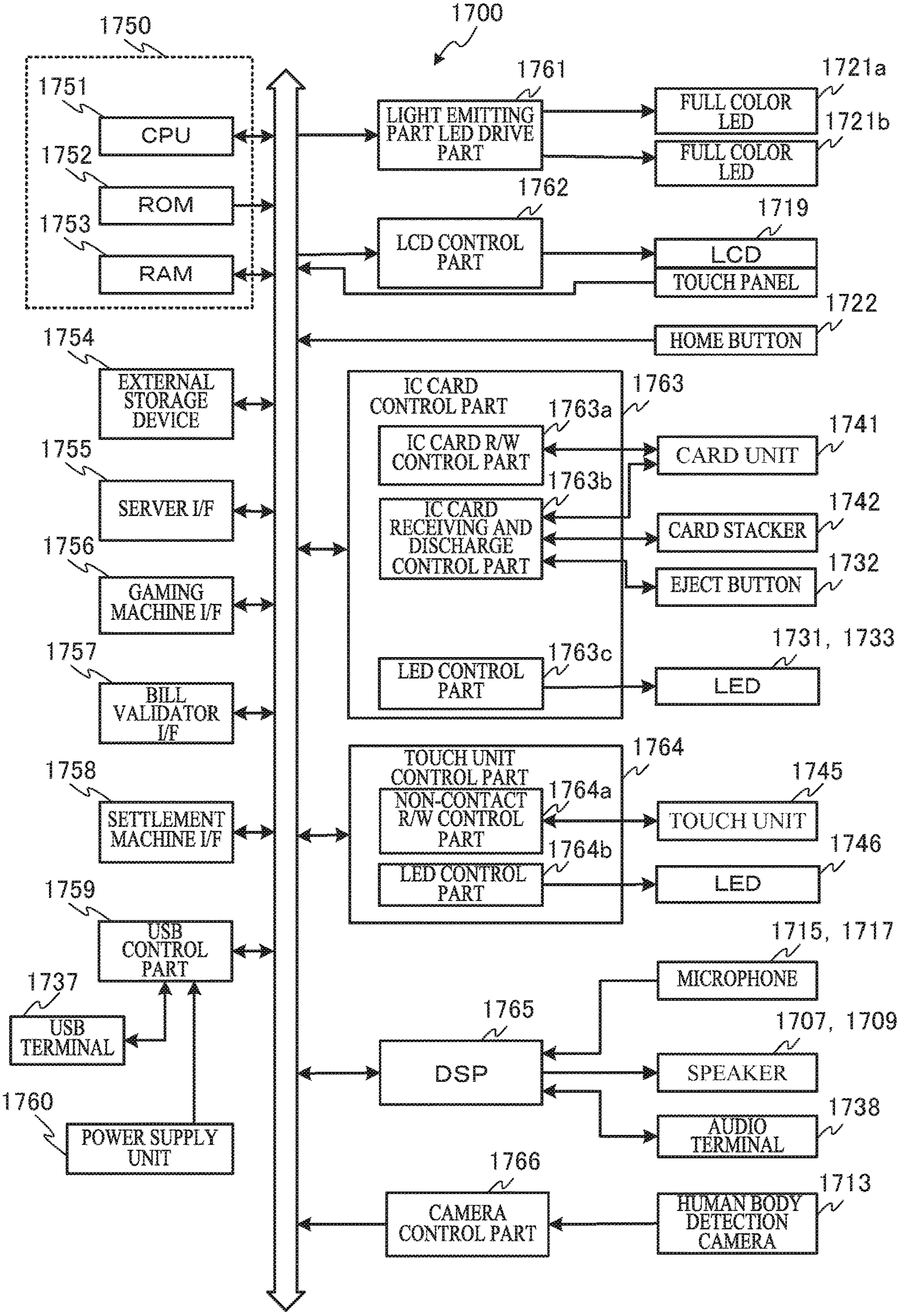
FIG. 5 is a block diagram illustrating a configuration of the PTS terminal according to the embodiment of the present invention.

Next, a configuration of a circuit provided in the PTS device 1700 will be described with reference to FIG. 5.

A PTS controller 1750 that controls the PTS device 1700 includes a CPU 1751, a ROM 1752, and a RAM 1753.

The CPU 1751 performs the execution control of each component of the PTS device 1700, and executes or computes various programs stored in the ROM 1752. For example, the CPU 1751 executes a credit update program to update the credit related data stored in the IC card 1500.

The ROM 1752 is formed of a memory device such as a flash memory, and the like, and stores permanent data to be executed by the CPU 1751. For example, the ROM 1752 stores the credit update program that rewrites the credit related data stored in the IC card 1500, an interlocking performance control program to be executed in response to a request from a bonus server (not illustrated), and a notification program to be executed in response to a request (notification information, and the like) from the hotel server 500.

The RAM 1753 temporarily stores data necessary when various programs stored in the ROM 1752 are executed.

An external storage device 1754 is, for example, a storage device such as a hard disk device, and stores a program to be executed by the CPU 1751 and data used by the program to be executed by the CPU 1751.

A server interface (I/F) 1755 implements data communication between a server such as the hotel server 500, the bonus server (not illustrated), and the like and the PTS device 1700. A gaming machine I/F 1756 implements data communication between the game controller 70 of the slot machine 1010 and the PTS device 1700, and a predetermined protocol may be used for the data communication.

The PTS device 1700 is connected to the bill entry 60 via a bill validator I/F 1757 and connected to a settlement machine (not illustrated) via a settlement machine I/F 1758, and can transmit and receive data as necessary.

A USB control part 1759 determines whether to supply power from a power supply unit 1760 to the USB terminal 1737 and can charge the USB terminal 1737 when a predetermined condition is satisfied. The player can charge an electronic device by connecting the electronic device to the USB terminal 1737 when the predetermined condition is satisfied.

In order to cause a light emitting plate 1720*a* on the upper side of the LCD 1719 to emit light in response to a notification request from the hotel server 500, an interlocking performance start request from the bonus server (not illustrated), and the like, a light emitting part LED drive part 1761 controls the full color LED 1721*a* to be turned on at a predetermined timing, and in order to cause the light emitting plate on the lower side of the LCD 1719 to emit light, the light emitting part LED drive part 1761 controls the full color LED 1721*b* to be turned on at a predetermined timing.

An LCD control part 1762 is controlled so that information contributing to the fraudulent act such as money laundering, member information, information for the member, and the like are displayed on the LCD 1719, and data read from the IC card 1500 and data inputted by the player are displayed. The LCD 1719 includes a touch panel function, and when the touch panel is operated by the player, a predetermined signal is transmitted to the CPU 1751.

A home button 1722 is provided near the LCD 1719 and is a button for shifting a screen displayed on the LCD 1719 to a predetermined upper screen. When the home button 1722 is pressed by the player, an operation of the player is transmitted to the CPU 1751, after which the CPU 1751 transmits a command to the LCD control part 1762 so as to update the display of the LCD 1719 according to the operation.

An IC card control part 1763 controls insertion and discharge of the IC card 1500, and writing of the credit data. The IC card control part 1763 includes an IC card reader and writer (R/W) control part 1763*a*, an IC card receiving and discharge control part 1763*b*, and an LED control part 1763*c*.

The IC card R/W control part 1763*a* controls the card unit 1741, thereby updating the credit related data (game value information) stored in the IC card 1500. When the IC card 1500 is newly issued, the credit related data corresponding to the settled amount are stored. The card unit 1741 includes an antenna part for reading or writing data from or to the IC card 1500 by NFC, and the like.

The card unit 1741 includes functions of an IC card reader for reading the information stored in the IC card 1500 and of an IC card writer for writing the information to the IC card 1500, but may include any one of the above-described functions as necessary.

The IC card receiving and discharge control part 1763*b* controls receiving and discharge of the IC card 1500. When the IC card 1500 is inserted into the card insertion slot 1730 by a player, the IC card is controlled to be held in the card unit 1741 while the player executes a game. After the credit related data are written into the IC card 1500 at the time of settlement, the IC card 1500 is controlled to be discharged therefrom. When the eject button 1732 is pressed, the IC card 1500 is discharged.

When the IC card 1500 is newly issued, the IC card 1500 is newly taken out of the card stacker 1742, and then the IC card 1500 is supplied to the card unit 1741 in order to store the credit related data.

The LED control part 1763*c* is controlled so that the LED (full color LED 1731) provided near the card insertion slot 1730 of the card unit 1741 is turned on and the LED (red LED 1733) provided near the eject button 1732 is turned on.

A touch unit control part 1764 controls data transmission and reception according to a touch operation of the IC card 1500, a mobile phone, a smart phone, and the like. The touch unit control part 1764 includes a non-contact R/W control part 1764*a* and an LED control part 1764*b*.

The non-contact R/W control part 1764*a* determines whether the IC card 1500 or the mobile phone approaches a predetermined distance (for example, a touch operation is performed) in the touch unit 1745, and when the IC card 1500 or the mobile phone approaches the predetermined distance, the non-contact R/W control part 1764*a* acquires a reading result, and the like from the touch unit 1745. The touch unit 1745 includes an antenna part for transmitting and receiving data to and from the IC card 1500 and the mobile phone by NFC, and the like.

The touch unit 1745 includes functions of an IC card reader for reading information stored in the IC card 1500 and the mobile phone, and an IC card writer for writing information to the IC card 1500 and the mobile phone, but may include any one of the above-described functions as necessary.

The LED control part 1764*b* controls the LEDs 1746 disposed at four corners of the front surface of the touch unit 1745 and lights the LEDs 1746 at a predetermined timing.

A DSP 1765 receives voice data acquired from microphones 1715 and 1717, performs predetermined voice processing, and transmits the voice data to the CPU 1751. The DSP 1765 transmits the received voice data to speakers 1707 and 1709. The DSP 1765 outputs the received voice to the headphone with respect to the audio terminal connected to the headset, processes the voice received from the microphone, and transmits the processed voice to the CPU 1751. Here, a schematic configuration is illustrated and an A/D converter, a D/A converter, an amplifier, and the like are omitted.

A camera control part 1766 acquires an image of a player, and the like captured by the human body detection camera 1713, performs predetermined image processing as necessary, and transmits the processed data to the CPU 1751. The data are transmitted to, for example, the hotel server 500, a member hotel server 13, and the like via the server I/F 1755.

The camera control part 1766 transmits imaging information captured by the human body detection camera 1713 to the hotel server 500, and the like in response to an instruction from the hotel server 500.

[Configuration of Game Table Device]

Figure 6:
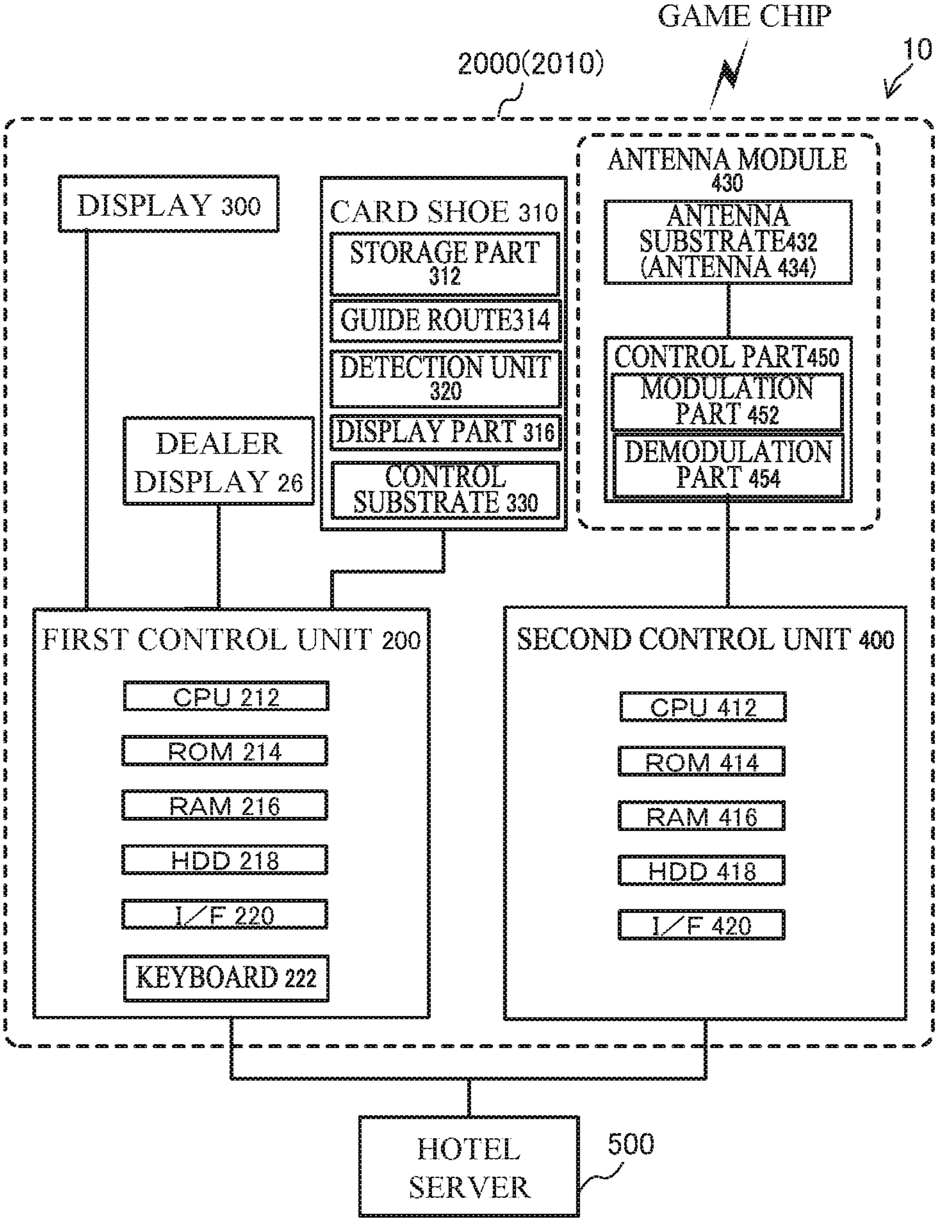
FIG. 6 is a functional block diagram illustrating an outline of a game table system according to an embodiment of the present invention.

Hereinafter, a game table device 2000 according to the embodiment of the present invention will be described in detail with reference to the accompanying drawings. FIG. 6 is a functional block diagram illustrating an outline of a game table system 10. The game table system 10 is installed in a game facility such as a casino.

The game table system 10 includes the game table device 2000 and the hotel server 500. The game table device 2000 includes game tables 2010A, 2010B, and the like (hereinafter referred to as a game table 2010) (not illustrated). The game table is a so-called casino table.

The game table device 2000 includes a first control unit 200, a game result notification display 300, a card shoe 310, a second control unit 400, and an antenna module 430.

The first control unit 200 is configured by a computer, mainly includes a central processing unit (CPU) 212, a read only memory (ROM) 214, a random access memory (RAM) 216, an hard disk drive (HDD) 218, a communication I/F (communication interface) 220, a keyboard 222, and the like, and is communicably connected by a data bus and an address bus (not illustrated). The ROM 214 stores character information and color information displayed on a dealer display 26 for each player in response to a progress direction of the game.

The game result notification display 300 is connected to the first control unit 200. Under the control of the first control unit 200, the game result notification display 300 displays information on a result of the game performed on the game table 2010, for example, such as winning or losing and information on winning or losing. The player can visually recognize various information displayed on the game result notification display 300. Details of the information displayed on the game result notification display 300 will be described later.

The card shoe 310 is connected to the first control unit 200. The card shoe 310 is operated by a dealer. The card shoe 310 stores a plurality of game cards such as playing cards, and the like. The dealer takes out the game card from the card shoe 310 and arranges the game card on the game table 2010.

The identification information of the game card to be taken out from the card shoe 310 is transmitted to the first control unit 200. The first control unit 200 determines the progress and result of the game from the identification information of the game card transmitted from the card shoe 310. Details of the card shoe 310 will be described later.

The second control unit 200 is configured by a computer, mainly includes a central processing unit (CPU) 412, a read only memory (ROM) 414, a random access memory (RAM) 416, an hard disk drive (HDD) 418, and a communication I/F (communication interface) 420, and is communicably connected by a data bus and an address bus (not illustrated).

The antenna module 430 is communicatively connected to the second control unit 400. The antenna module 430 reads the identification information of the game chip and transmits the read identification information to the second control unit 400. Details of the antenna module 430 will be described later.

The first control unit 200, the second control unit 400, and the hotel server 500 are communicably connected to each other via a network (not illustrated). The network may be formed inside the game facility or may be formed outside the game facility. The hotel server 500 mainly manages information on the game such as the game chip, the player, and the like. The game chip is a medium including a monetary value in the game facility. All the game chips used in the game facility are managed by the hotel server 500. Chip identification information different from each other is assigned to all the game chips. A state of the game chip is managed based upon the chip identification information. The state of the game chip includes a state where the game chip is held by the player, a state where the game chip is stored in the game facility, and the like. The hotel server 500 stores and manages the pieces of information as a database. When the state of the game chip changes, the database is updated each time.

The hotel server 500 may be installed inside the game facility or may be installed outside the game facility. It is desirable to manage the information on the game by being communicably connected by the network.

As the game chips used in the game table device 2000 (2010A, 2010, . . . 2010X), a specific game chip given to a player who participates in the rolling program and a normal game chip used by a general player who does not participate in the rolling program can be used.

The chips have, for example, different external shapes and colors, and the dealer who plays the game can distinguish the chips bet by the player by the shape (external shape) and color thereof.

In the embodiment, the specific game chip that can be distinguished in appearance such as the shape and color of the chip itself is used in the game table device, such that while visually checking the chip, the dealer receives a BET of the specific game chip and the normal game chip, and returns a dividend (prize money) as a result of the game to the player by the normal game chip.

[Circuit Configuration of IC Card]

Hereinafter, a circuit configuration of the IC card 1500 will be described with reference to FIG. 7 of the accompanying drawings. FIG. 7A is a block diagram illustrating the circuit configuration of the IC card 1500 according to an embodiment of the present invention. The IC card 1500 includes: an input and output part 1510 used as an interface for transmitting and receiving information to and from an information card reading part in a non-contact manner; a non-volatile storage part 1520 having a function as a storage unit; and a control part 1530 having a function as a control unit for controlling the input and output part 1510 and the non-volatile storage part 1520.

Figures 7A, 7B:
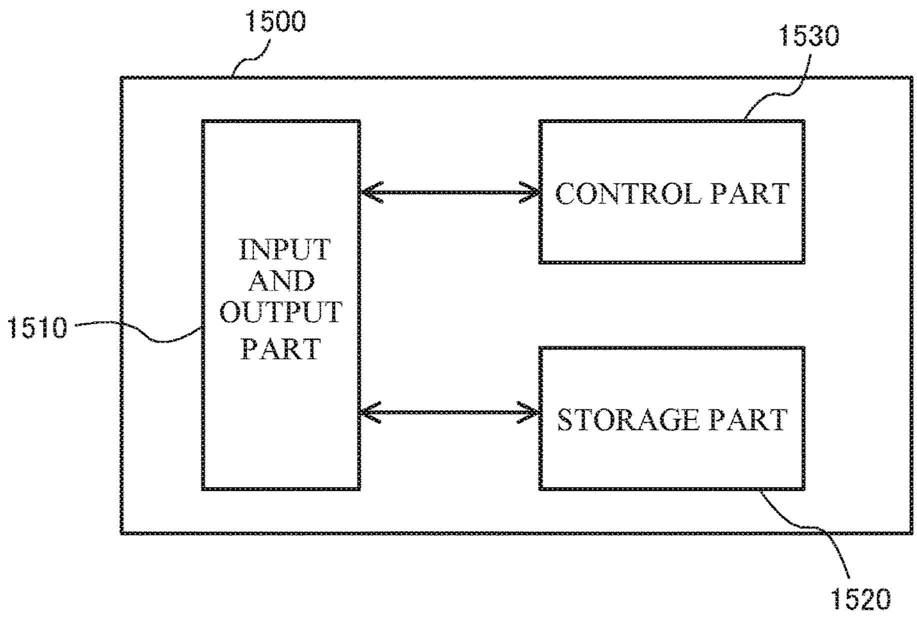
FIGS. 7A and 7B are block diagrams illustrating an overall configuration of an IC card and a conceptual diagram illustrating a configuration of a storage part according to an embodiment of the present invention.

FIG. 7B is a conceptual diagram illustrating an area for storing four types of game value information provided in the storage part 1520 of the IC card 1500 as types. A first area is the first storage area AR1 for storing a game value corresponding to deposit money deposited for the player to participate in the rolling program; and the game value stored in the first storage area AR1 cannot be converted into cash in the cashier 600 in principle and is only permitted to be used in a game by the slot machine 1010 (there is a limitation on the usage of the game value information). The prize money generated in the game in such a manner that the first game value information is read out from the first storage area AR1 and provided for the BET of the game is stored in the second storage area AR2. Information representing the amount of the game value stored in the first storage area AR1 is referred to as the first game value information.

A second area is the second storage area AR2 in which a game value corresponding to an arbitrary amount of money deposited by the player with cash can be stored and further cash conversion can be performed in the cashier (No limitations on the usage of the game value information). The second storage area AR2 can write a game value corresponding to a dividend obtained by playing the game into the slot machine 1010. Information representing the type and amount of the game value stored in the second storage area AR2 is referred to as the second game value information.

In principle, both the first game value information and the second game value information are treated as a cash equivalent.

A third area is the third storage area AR3 that cannot be deposited by the player, and that can store a game value awarded by the promotion by the game facility such as a casino, usage of the facility, game play, and the like. The game value stored in the third storage area AR3 cannot be converted into cash in the cashier 600 in principle, and is only permitted to be used in the game by the slot machine 1010 (so-called free play). Information representing the type and amount of the game value stored in the third storage area AR3 is referred to as the third game value information.

A fourth area is the fourth storage area AR4 that cannot be deposited by the player, and that can store the game value awarded by the promotion by the game facility such as the casino, the usage of the facility, the game play, and the like. The game value stored in the fourth storage area AR4 cannot be converted into cash in the cashier 600 in principle, and is permitted to be used for various services in the facility in addition to the usage in the game (so-called bonus credit). It is stored in the fourth storage area AR4. Information representing the amount of the game value stored in the fourth storage area AR4 is referred to as the fourth game value information.

In principle, both the third game value information and the fourth game value information are not treated as the cash equivalent.

[Slot Machine Control Processing]

Figure 8:
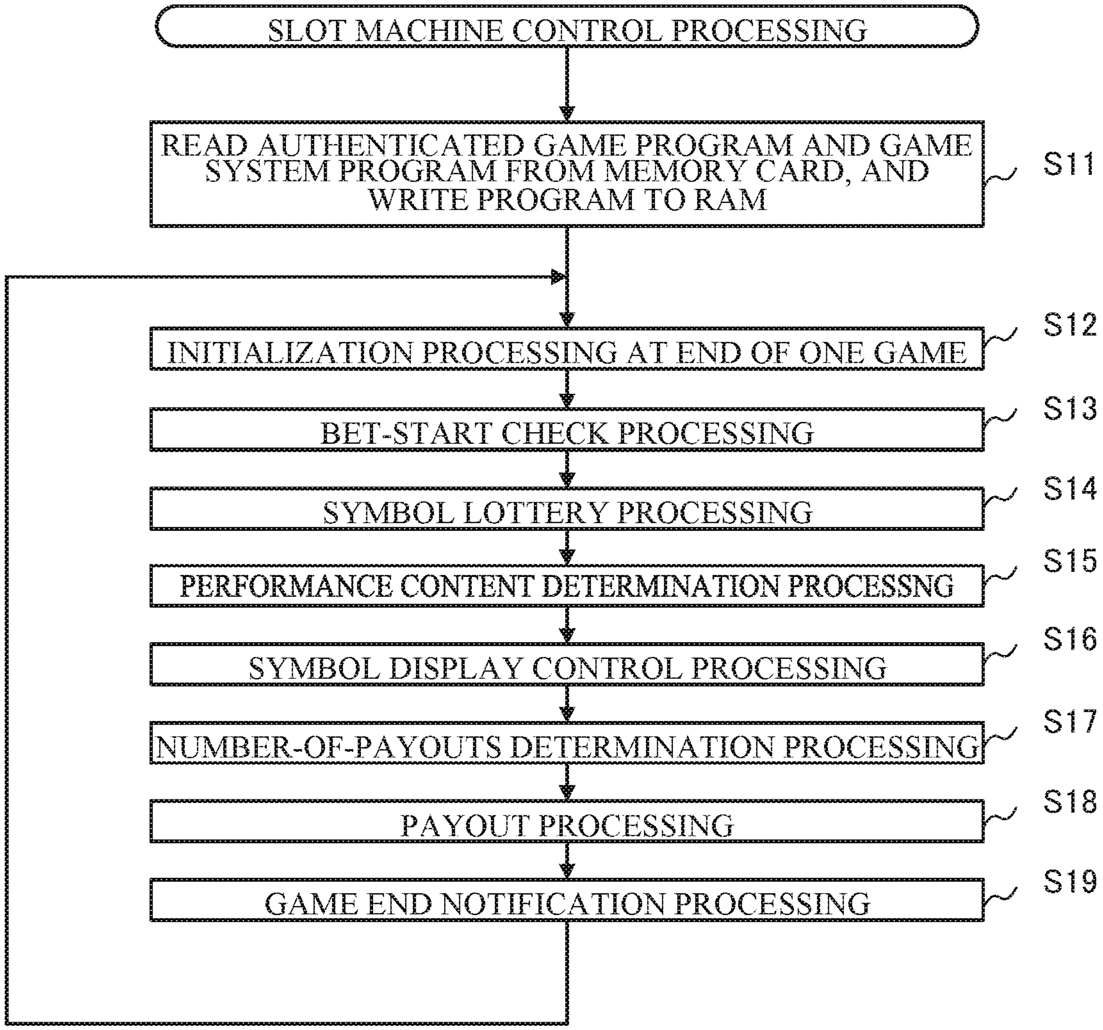
FIG. 8 is a flowchart illustrating slot machine control processing according to an embodiment of the present invention.

First, slot machine control processing will be described with reference to FIG. 8.

First, when power is supplied to the slot machine 1010, the game controller 70 reads out a game program and a game system program, and then writes the read game program and the game system program into the RAM (S11).

Next, in order to start a game, the game controller 70 performs initialization processing at the end of one game (S12). For example, unnecessary data such as the number of bets, symbols determined by lottery, and the like are cleaned for each game in one normal mode in a work area of the RAM.

Next, the game controller 70 performs bet and start check processing which will be described later (S13). In the present processing, input checks such as a BET switch 34S, a credit switch 40S, a spin switch 46S, a denomination changeover switch 47S, and the like are performed. When receiving insertion information indicating that a bill is newly inserted from the PTS device 1700, in the bet and start check processing (S13), the game controller 70 updates specific currency information (an amount of money represented by a specific currency "peso" and the number of credits corresponding to the amount of money) stored in the game controller 70 for a player to play the game. Specifically, the specific currency information to be converted from the amount of money of the newly inserted bill is added to specific currency information already stored in the storage part. That is, the slot machine 1010 is configured to perform game processing (bet, calculation of the dividend, payout, and the like) by a specific currency unit (for example, "peso"), and in the game controller 70, the amount of money such as a bill inserted by a player and a prize money given as a result of the game is managed as the specific currency information by the specific currency unit.

When the bill of the specific currency unit (for example, "peso") is inserted into the bill entry 60, an amount of money by the inserted specific currency unit (for example, "peso") and the number of credits corresponding to the amount of money are stored in the storage part of the game controller 70. In the "storage" here, when the specific currency information for the player to play the game is already stored in the storage part of the game controller 70, the storage is a concept that includes processing of being added to the amount of money of the currency information and the number of credits. The pieces of information may be stored in the storage part of the PTS device 1700.

On the other hand, when the currency unit of the newly inserted bill is different from the specific currency (for example, when "Dollar" is inserted), the specific currency information as a result of conversion from the inserted amount of money by the inserted currency unit to the amount of money represented by the specific currency unit (for example, "Peso") is stored in the storage part of the game controller 70. The conversion is executed in the PTS device 1700, a conversion result is transmitted from the PTS device 1700 to the game controller 70, and is stored.

Thus, when the bill is inserted into the bill entry 60, after updating the specific currency information for playing the game being stored in the game controller 70 based upon the amount of bills inserted here, the input checks such as the BET switch 34S, the credit switch 40S, the spin switch 46S, and the like are performed.

Next, the game controller 70 performs symbol lottery processing (S14). In the processing, a symbol to be displayed in a middle stage area of a symbol display area (display window 1150) from among a plurality of symbols arranged in a video reel is determined as a stop-scheduled symbol. Thus, 15 pieces of symbols displayed in the symbol display area (display window 1150) are determined.

Then, the game controller 70 stores the determined stop-scheduled symbol in the symbol storage area provided in the RAM.

Next, the game controller 70 performs performance content determination processing (S15). The game controller 70 extracts a random numerical value for the performance, and determines any one of a plurality of predetermined performance contents by lottery.

Next, the game controller 70 performs symbol display control processing (S16). In the symbol display control processing, video reel scrolling is started, and after a predetermined time has elapsed, the stop-scheduled symbols determined in the normal mode symbol lottery processing of S14 are sequentially stopped in the middle stage of the symbol display area (display window 1150). That is, 15 pieces of symbols including the stop-scheduled symbols are rearranged in the symbol display area (display window 1150). That is, symbols corresponding to code numbers before and after the stop-scheduled symbols are rearranged in an upper stage and a lower stage of the symbol display area (display window 1150).

Next, the game controller 70 performs number-of-payouts determination processing (S17). In the processing, based upon a symbol combination table stored in the RAM, it is determined whether a winning is achieved in such a manner that the same types of symbols extend from a first column area to a fifth column area and are connected to each other in a predetermined number in an area which becomes a target of the winning determination by WAYS BET in the symbol display area (display window 1150). Then, in response to the winning and the value of the BET number counter (bet credit type), a privilege such as a dividend and a free game execution right is awarded. The awarded dividend is stored in a number-of-payouts storage area provided in the RAM.

Next, payout processing is performed (S18). The game controller 70 adds a value stored in the number-of-payouts storage area to a value of the number-of-credits counter provided in the RAM. Here, for example, when a player presses a CASHOUT button 32 of the control panel 30, the CASHOUT switch (not illustrated) that detects a fact that the CASHOUT button 32 is pressed outputs a signal to the main CPU (not illustrated) of the game controller 70, and balance information being stored in the IC card 1500 held in the card unit 1741 of the IC card control part 1763 is updated to the value of the number-of-credits counter. In the update, the first to fourth storage areas AR1 to AR4 are provided as storage areas of the balance information of the IC card 1500, and in the PTS terminal 1700, after the game is played, in writing processing by the operation of the CASHOUT button 32 until the next game is started, the game value information is written in the storage area (second storage area AR2) where the game value that can be converted into cash of the IC card 1500 is stored.

That is, the first storage area AR1 and the second storage area AR2 are areas where the game value information that is treated in principle as the cash equivalent is stored; and when the game value information is read from the first storage area AR1 and used for a bet of a game, the dividend of the game is stored in the second storage area AR2. That is, in principle, the first game value information stored in the first storage area AR1 that cannot be directly converted into cash is stored as the second game value information in the second storage area AR2 that can be converted into cash after being provided for the game. Accordingly, the first game value information that cannot be directly converted into cash is stored in the IC card 1500 as the second game value information that can be converted into cash after being provided for the game.

The third storage area AR3 and the fourth storage area AR4 are areas where the game value information that is not treated in principle as the cash equivalent (the third game value information stored in the third storage area AR3 can be bet on the game as a point; the fourth game value information stored in the fourth storage area AR4 can be used as a point for the game and other various services; and in principle, both the third game value information and the fourth game value information cannot be converted into cash) is stored; and when the game value information is read from the third storage area AR3 and the fourth storage area AR4 and used for the bet of the game, the dividend of the game is stored in the second storage area AR2. That is, the third game value information stored in the third storage area AR3 that cannot be directly used for various services in the facility, and the fourth game value information stored in the fourth storage area AR4 are stored as the second game value information in the section storage area AR2 after being provided for the game.

Since both the first game value information and the second game value information are treated as the cash equivalent whereas neither the third game value information nor the fourth game value information is treated as the cash equivalent, the game value information read from the third storage area AR3 or the fourth storage area AR4 is restricted to being written into the first storage area AR1. That is, the conversion between the game value information treated as the cash equivalent and the game value information not treated as the cash equivalent is restricted so as not to be performed.

Accordingly, in the IC card 1500 of a player who participates in the rolling program and purchases a game value by cash, the game value purchased by the program is stored in the first storage area AR1, and when the first game value information stored in the first storage area AR1 is provided to the BET of the game, the dividend (prize money) generated as a result of the game is written into the second storage area AR2 by the operation of the CASHOUT button 32, thereby making it possible to directly perform the cash conversion thereafter.

In the IC card 1500 of a player who participates in the rolling program and acquires a game value by a point, the game value acquired by the program is stored in the third storage area AR3, and when the third game value information stored in the third storage area AR3 is provided to the BET of the game, the dividend (prize money) generated as a result of the game is written into the second storage area AR2 by the operation of the CASHOUT button 32, thereby making it possible to directly perform the cash conversion thereafter.

In the IC card 1500 of a player who is awarded a game value given by a point such as promotion by the game facility such as the casino, the usage of the facility, the game play, and the like, the awarded game value is stored in the fourth storage area AR4, and when the fourth game value information stored in the fourth storage area AR4 is provided to the BET of the game, the dividend (prize money) generated as a result of the game is written into the second storage area AR2 by the operation of the CASHOUT button 32, thereby making it possible to directly perform the cash conversion thereafter.

When the CASHOUT button 32 is inputted after the game, the normal game chip that can be converted into cash may be paid out from the slot machine 1010, as a way of designating the payout of the dividend (prize money) to be paid out as a result of the game.

Next, the main CPU 1071 performs game end notification processing (S19). The game end notification processing is processing of transmitting data indicating that one unit game ends to the PTS device 1700. The PTS device 1700 transmits the data to the hotel server 500, and in response thereto, the lottery of the bonus game, and the like are performed. When the processing of S19 is completed, the processing is returned to the processing of S12 and the unit game is repeated.

In the embodiment, a case in which the game value (dedicated credit) purchased in the rolling program is stored in the first storage area AR1 to be used separately from other game values is described, but the storage area of the game value used in the rolling program is not limited to the first storage area AR1, and for example, when the area corresponding to the third storage area AR3 or the fourth storage area AR4 is not used, the third storage area AR3 or the fourth storage area AR4 may be used as the first storage area AR1. That is, as the storage area of the IC card 1500 for storing the credit data, the hotel server 500, and the slot machine 1010, and as the storage area for storing the credit for the rolling program, as long as the third storage area AR3 or the fourth storage area AR4 is not used in addition to the above-described first storage area AR1, the storage areas may be used as the first storage area AR1, thereby being used as an area for storing the dedicated credit for the rolling program.

[Game Processing by PTS Device]

Figure 9:
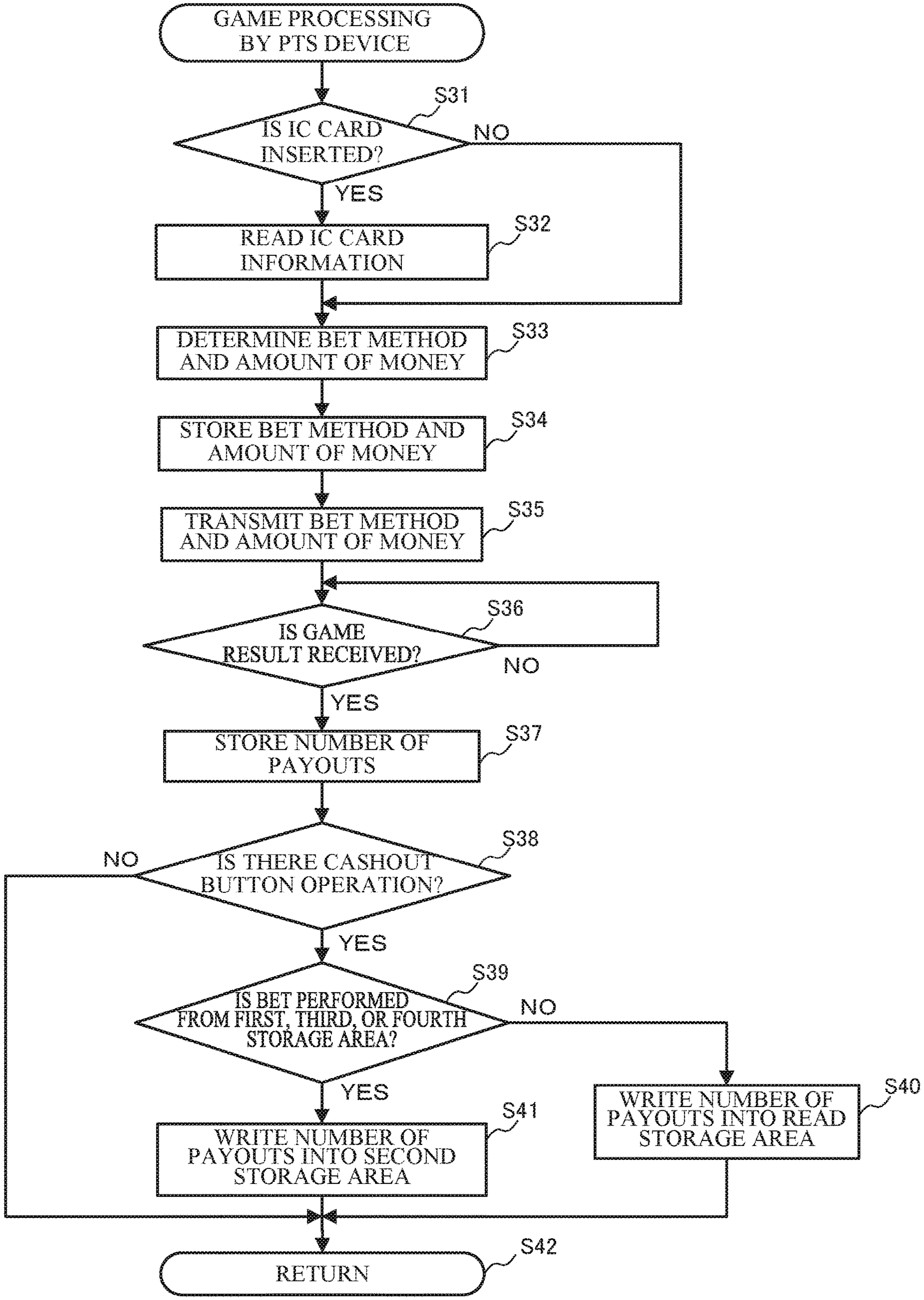
FIG. 9 is a flowchart illustrating game processing by the PTS device according to the embodiment of the present invention.

Next, game processing by the PTS device 1700 will be described. As illustrated in FIG. 9, the PTS device 1700 first determines whether the IC card 1500 is inserted from the card insertion slot 1730 in step S31. When a positive result is obtained here, the PTS device 1700 shifts the processing to step S32 and reads information written in the inserted IC card 1500. On the other hand, when a negative result is obtained in step S31, it indicates that the IC card 1500 is already inserted into the card insertion slot 1730, and the PTS device 1700 shifts the processing to step SP33 which will be described later.

When reading the information of the IC card 1500 in step S32, the PTS device 1700 shifts the processing to step S33, and receives selection of a BET method and an amount of money by the player. In the PTS terminal 1700, the player can select the BET method and the BET amount by the touch panel function of the LCD 1719. The BET method means that the game value (any one of the first game value information to the fourth game value information) stored in the four storage areas AR1 to AR4 of the inserted IC card 1500 is selectively used for the game. Specifically, the player can select the first to fourth game value information and the amount from the IC card 1500 by operating the touch panel of the LCD 1719. The selection is not restricted to selecting one type from among the first to fourth game value information, and a plurality of types can be selected simultaneously. Here, the amount to be provided for the game can be selected for each selected type.

When receiving the selection of the BET method and the amount of money by the player in step S33, the PTS device 1700 shifts the processing to step S34, and writes and stores the BET method and the amount of money selected by the player in the RAM 1753. The PTS device 1700 shifts the processing to step S35 and transmits information on the BET method and the amount of money written into the RAM 1753 to the slot machine 1010 in step S34.

Next, the PTS device 1700 shifts the processing to step S36, and determines the presence and absence of the reception of the game result transmitted by the slot machine 1010. When a positive result is obtained in step S36, the PTS device 1700 shifts the processing to step S37, and stores the number of payouts in the RAM 1753 on the basis of the game result information obtained in step S36. On the other hand, when a negative result is obtained in step S36, it indicates that the unit game does not end, and the PTS device 1700 returns the processing to step S35.

The PTS device 1700 stores the amount (the number of payouts) of the dividend (prize money) generated by the game received as a result of the game in step S37 in the RAM 1753, after which the PTS device 1700 shifts the processing to step S38, and determines whether the player operates the CASHOUT button in the slot machine 1010. When a positive result is obtained, the PTS device 1700 shifts the processing to step S39, and in step S33, it is determined whether the BET by the player is performed from the first storage area AR1 or the third storage area AR3 or the fourth storage area AR4 of the storage part 1520 in the IC card 1500. On the other hand, when a negative result is obtained in step S38, the negative result means that the player does not finish the game in the slot machine 1010, and the PTS device 1700 shifts the processing to step S42.

When a positive result is obtained in step S39, the PTS device 1700 shifts the processing to step S41, and writes an amount of a ratio corresponding to a ratio of an amount read out from the first storage area AR1 and provided for the game from among the prize money (the number of payouts) stored in step S37 into the second storage area AR2 in the storage part 1520 provided in the IC card 1500. An amount of a ratio corresponding to a ratio of an amount read out from the third storage area AR3 and provided for the game from among the prize money (the number of payouts) stored in step 37 is written into the second storage area AR2. An amount of a ratio corresponding to a ratio of an amount read out from the fourth storage area AR4 and provided for the game from among the prize money (the number of payouts) stored in step 37 is written into the second storage area AR2.

On the other hand, when a negative result is obtained in step S39, in the game, it indicates that the player performs the BET from a game value area of the second storage area AR2 of the storage part 1520 in the IC card 1500, after which the PTS device 1700 shifts the processing to step S40 and writes the prize money (the number of payouts) stored in step S37 into the same storage area as the storage area (second storage area AR2) read out by the player for the BET. Next, the PTS device 1700 shifts the processing to step S42, completes the processing of one game, and waits for the start of the next game.

As described above, in the game processing according to the embodiment, the prize money obtained by providing the game with the first game value information that can be provided, in principle, only for the game is written in the second storage area AR2 of the IC card 1500 as the second game value information that can be converted into cash, whereby the game can be played in the slot machine 1010 by using the game value awarded by the rolling program. That is, a plurality of types of game value information (first to fourth game value information) can be stored as the game values to be stored in the IC card 1500; the plurality of types of game value information are distinguished and read out by the PTS terminal 1700, and are provided for the BET of the game; based upon the breakdown of the total number of BETs (the amount of the first to fourth game value information from among the total number of BETs) and the total dividend amount (the total prize amount of one game) generated in the BET game, the breakdown (amount of each of the first to fourth game values) of each game value (first to fourth game values) in the total dividend amount, which is a result of multiplying each ratio of the amount of the first to fourth game value information by the total dividend amount (total prize amount of one game) generated in the BET game, among the total number of BETs is calculated; the amount of the breakdown is changed to a predetermined area of the storage areas (first to fourth storage areas AR1 to AR4) of the IC card 1500 and can be written; and after the game value that can only be used for the game (game value awarded by the rolling program) is provided for the game, the game value is written in the IC card 1500 as the game value that can be converted into cash, thereby making it possible to play the game by using the game value awarded for the rolling program in the slot machine 1010. Accordingly, it is not necessary to mechanically modify the slot machine 1010 so as to make the game chip for the rolling program usable.

[From IC card Issuance to Cash Conversion in Rolling Program]

Figure 10:
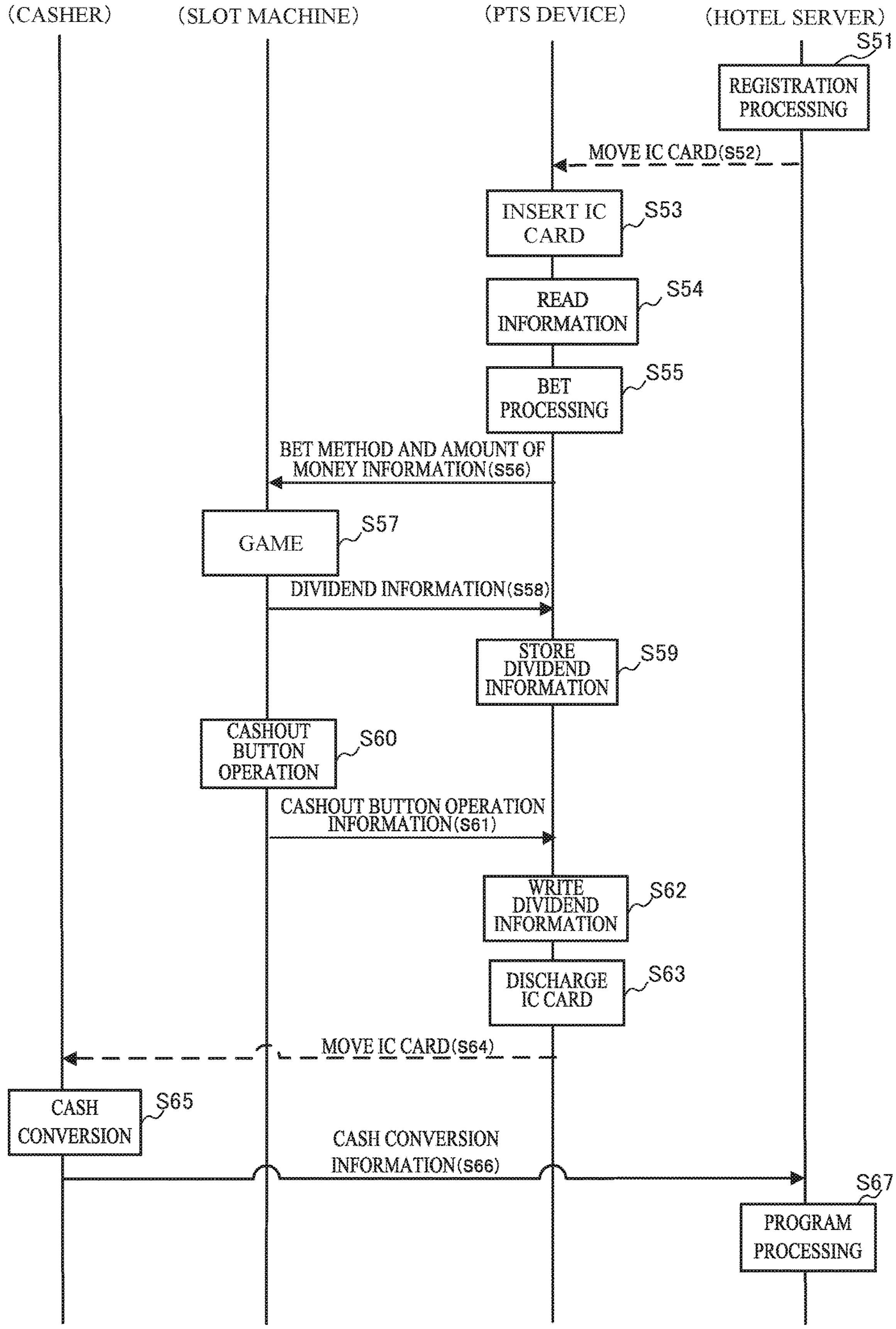
FIG. 10 is a flowchart illustrating a procedure of transmitting information from IC card issuance to cash conversion in a rolling program according to an embodiment of the present invention.

FIG. 10 is a flowchart illustrating a flow from issuance of the IC card 1500 to cash conversion, which is executed in the hotel server 500, the slot machine 1010, the PTS device 1700, and the cashier 600 in the rolling program.

When a player deposits deposit money in the game facility such as the casino, the hotel server 500 performs registration processing of the IC card 1500 (S51). The IC card 1500 is issued by the registration processing of the IC card 1500 by the hotel server 500; the player owning the IC card 1500 moves to a place where the slot machine 1010 is located to play a game (S52); and the IC card 1500 is inserted into the card insertion slot 1730 of the PTS device 1700. When receiving the insertion of the IC card 1500 (S53), the PTS device 1700 reads the information of the player written into the IC card 1500 (S54). When a BET method and an amount of money for the game are selected by the player (S55), the PTS device 1700 stores information on the BET method and the amount of money in the RAM 1753, and transmits the information on the BET method and the amount of money to the game controller 70 of the slot machine 1010 (S56). When the game controller 70 of the slot machine 1010 receives the information on the BET method and the amount of money selected by the player from the PTS device 1700, the game controller 70 starts the game processing in response to the operation of a start button by the player (S57).

When the game processing is terminated, the game controller 70 of the slot machine 1010 transmits dividend (prize money) information generated by the game processing to the PTS device 1700 (S58). The PTS device 1700 that receives the dividend information by the game processing from the slot machine 1010 writes and stores the dividend information in the RAM 1753 (S59). Next, when the slot machine 1010 receives the operation of the CASHOUT button by the player (S60), the slot machine 1010 transmits operation information of the CASHOUT button to the PTS device 1700 (S61), and the PTS device 1700 that receives the operation information of the CASHOUT button writes the dividend information stored in the RAM 1753 in a predetermined area based upon the game value information read out as the game value information (any one or plurality of the first to fourth game value information) to be provided for the BET among the storage areas (first to fourth storage areas AR1 to AR4) of the storage part 1520 in the inserted IC card 1500 (S62). Thereafter, the PTS device 1700 discharges the IC card 1500 (S63). Next, the player owning the discharged IC card 1500 moves to the cashier 600 (S64), and when the IC card 1500 is inserted into the card reader of the cashier 600, the cashier 600 pays out a currency corresponding to the number of payouts written in the second storage area AR2 of the storage part 1520 in the IC card 1500 to the player (S65). Next, the cashier 600 transmits cash conversion information of the player to the hotel server 500 (S66), and the hotel server 500 that receives the cash conversion information performs program processing and gives the player a privilege that can be received by participating in the rolling program (S67). The privilege may be awarded to the player at the point of time when the player deposits the deposit money in the game facility such as the casino.

The history of using the game chip given for the rolling program used in the game table 10, and the history of using the first, third, or fourth game value information read out from the first, third, or fourth storage area AR1, AR3, or AR4 of the IC card 1500 in the slot machine 1010 and provided for the game are transmitted from each gaming table 10 and each gaming machine 1010 to the hotel server 500, and the histories thereof are summed up in the hotel server 500, thereby making it possible to grasp an execution status of the rolling program including the game table 10 and the slot machine 1010. In particular, personal information is respectively associated with the game chip to be given for the rolling program and the IC card 1500 issued for the rolling program, thereby making it possible to always grasp a usage status of the rolling program of the member to which the rolling program is given in the whole casino system 100 including the game table 10 and the slot machine 1010.

[Setting Processing of Rolling Program]

In the rolling program according to the embodiment, the player (member) selects one of the plurality of rolling programs prepared in advance, and purchases a dedicated credit referred to as "Program Credit" in advance. The dedicated credit is a credit referred to as a so-called "Restricted Cashable Credit" that is restricted to directly performing the cash conversion, and when the dedicated credit purchased by the player is used up in the slot machine 1010, and the like within a period (Validity Days), the hotel server 500 awards the player a privilege set for each rolling program. A plurality of types of the period and the purchase amount of the rolling program (dedicated credit) are prepared in advance by the casino side as a package, and the player can select and purchase any one or a plurality of packages.

As the privilege, cash (credit), a point, a prize, preferential treatment such as facility use, and the like are prepared, and can be set in various combinations in response to the purchase amount of each program. When the privileges are awarded, the member information card of the player and the account information and the point of the member in the hotel server 500 are added by the amount awarded as the privilege.

The hotel server 500 includes a dedicated storage area for storing the dedicated credit used for the rolling program in the RAM 553 (FIG. 1). On the other hand, the slot machine 1010 is also configured to include a dedicated credit meter and store the dedicated credit in the credit meter.

The dedicated credit purchased by the player (member) is registered in an individual player account opened in the hotel server 500 and is also stored in the member information card owned by the player.

When the dedicated credit purchased by the player is not used up within a predetermined time period (Validity Days), the hotel server 500 causes the player to lose the right to acquire the privilege. The unused "Program Credit" may be converted into another point, and the like.

The casino system 100 according to the embodiment is configured to provide the above-described rolling program to the member. In the casino (hotel server 500), a plurality of various combination packages of the due date (Validity Days), the purchase amount, and the privilege to be awarded to the member when the purchased dedicated credit is used up in the slot machine game within the period are set in advance, and the member (player) selects and purchases any one of the set rolling programs.

By introducing such a rolling program, for the casino side, since there is a method in which the player purchases the dedicated credit to be used for the game in advance, the sales forecast of the slot machine 1010 and the certainty of the sales can be obtained. For the player side, when the conditions of the rolling program are satisfied, the privilege preferentially awarded over the normal play can be obtained.

[Rolling Program Purchase Processing]

In the casino system 100 according to the embodiment, candidates of the rolling program that can be selected by the member are prepared in advance at the casino side, and the member can select a desired program from the prepared candidates.

Figure 11:
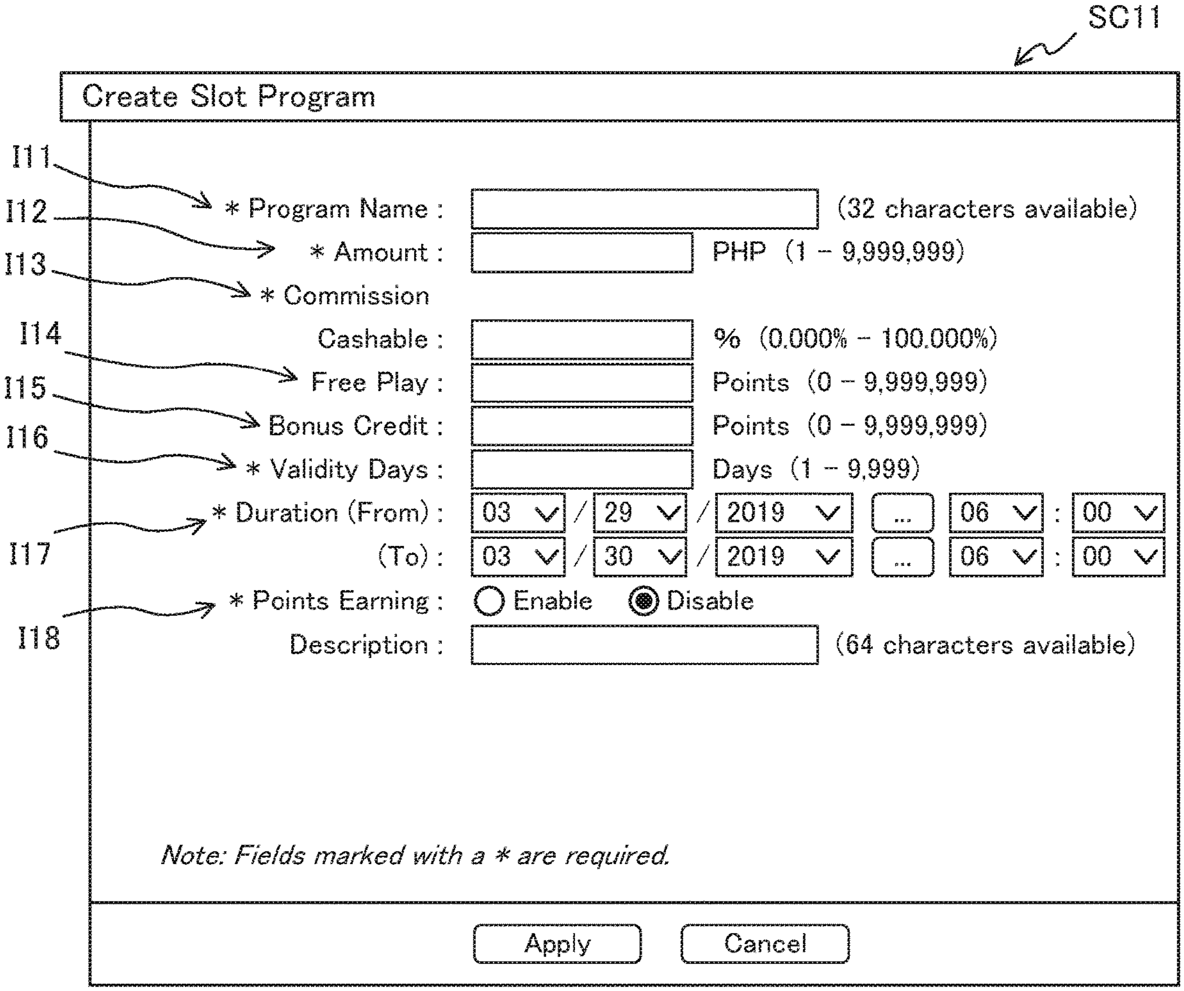
FIG. 11 is a diagram illustrating a setting screen SC11 according to an embodiment of the present invention.

When the rolling program candidates are generated in advance, in the hotel server 500, a setting screen SC11 illustrated in FIG. 11 is displayed on the display device (LCD 562 (FIG. 1)) and a staff in charge inputs a necessary item via the setting screen SC11, thereby making it possible to generate the rolling program candidates in advance in the database of the hotel server 500.

FIG. 11 is a diagram illustrating a display example of a display screen of a terminal device used when the casino side generates the rolling program in advance. As illustrated in FIG. 11, a plurality of items (I11 to I18) are configured to be inputted to the setting screen SC11 for setting the rolling program. The input item I11 (Program Name) is used to set the name of the rolling program (Slot program name); the input item I12 (Amount) is used to set a dedicated game value (Program Credit, a purchase amount (Slot program amount) of a first game value V1 (value data stored in the first storage area AR1) which is a dedicated credit for the rolling program corresponding to the non-negotiation chip) to be purchased in order to start a program to be set; the input item I13 (Commission Cashable) is used to set a ratio (Rebate) with respect to the purchase amount of the game value (credit) that is returned to the member when the dedicated game value (first game value V1) is completely used up within a predetermined period (Validity Days) after the start of the rolling program; the input item I14 (Commission Free Play) is used to set the number of points for free play (Free Play Commission Amount) (third game value V3 which is the number of points that can be used only in the slot machine 1010) to be awarded to the member as a privilege when the dedicated game value (first game value V1) is completely used up within the predetermined period (Validity Days) after the start of the rolling program; the input item I15 (Commission Bonus Credit) is an item to designate the number of bonus credit points (Bonus Credit Commission Amount) (fourth game value V4 which is the number of points that can be used in other services such as eating and drinking at the casino in addition to the slot machine 1010) to be awarded to the member when the dedicated game value (first game value V1) is completely used up within the predetermined period (Validity Days) after the start of the rolling program; the input item I16 (Validity Days) is used to set the time when the predetermined period has elapsed after the start of the rolling program as a validity period of the rolling program (Validity days after program credit is activated); the input item I17 (Duration) is used to set a holding period (slot program duration date and time) during which the selected rolling program is held; and the input item I18 (Points Earning) is used to set whether or not to award a separately set point (Enable/Disable).

In the hotel server 500, a plurality of rolling program candidates (packages) can be generated in advance via the above-described setting screen SC11. A reception terminal device of a reception counter is connected to the hotel server 500, displays information of the plurality of rolling program candidates generated in the hotel server 500, and can select any one or plurality of the candidates in response to a request of the member.

Figure 12:
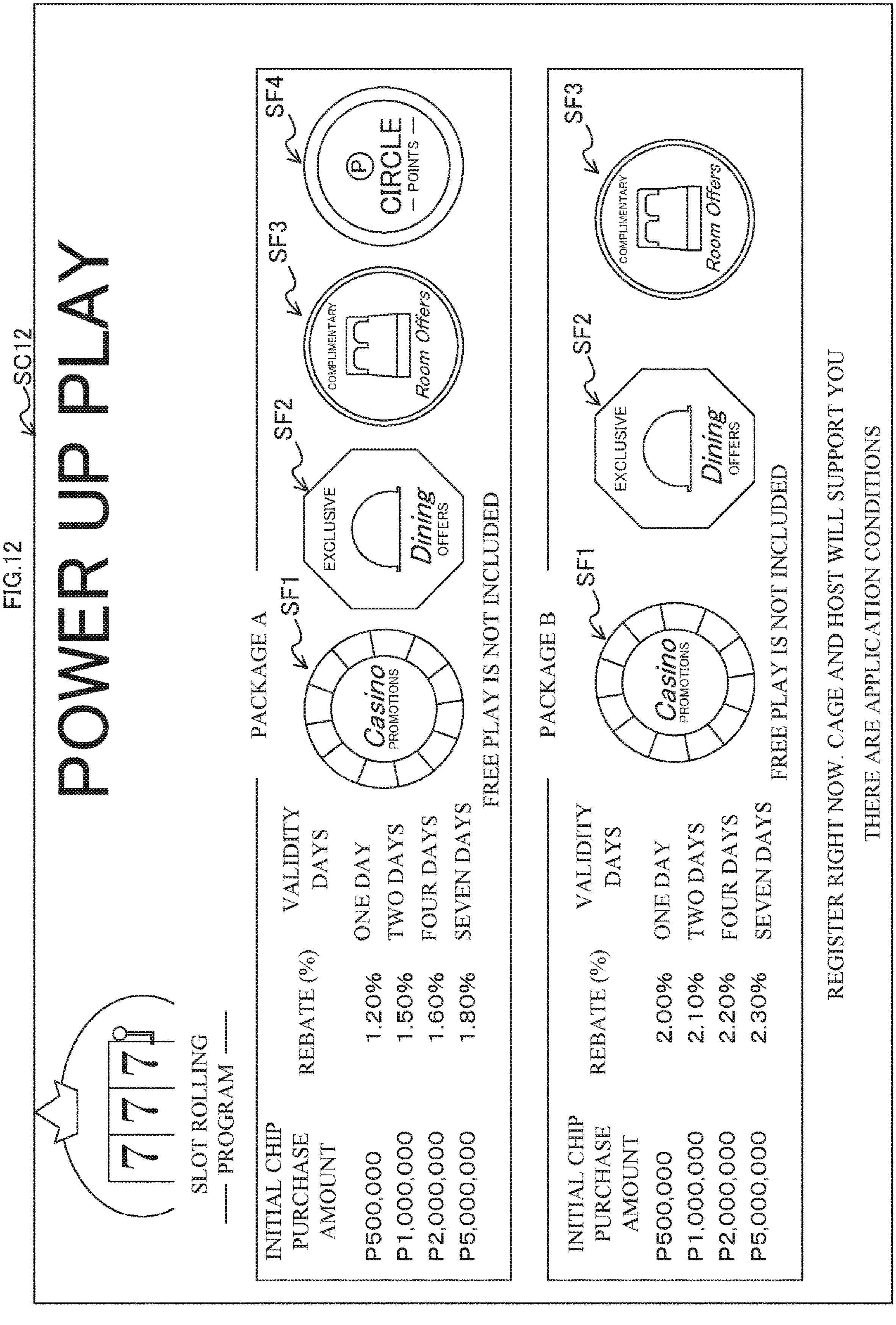
FIG. 12 is a diagram illustrating an introduction screen SC12 according to an embodiment of the present invention.

FIG. 12 is a diagram illustrating a display example in the display device of the reception terminal device. As illustrated in FIG. 12, in the display device of the reception terminal device, an introduction screen SC12 for displaying the plurality of rolling program candidates generated in the hotel server 500 as a package A, a package B, and the like is displayed.

The staff in charge can select and operate the rolling program in response to the member's desire. At the time of the selection operation, the staff in charge inputs the member information such as a member number, and the like into the reception terminal device by using the member information card presented by the member, whereby it is possible to register the usage of the rolling program associated with the member. The registration information is transmitted from the reception terminal device to the hotel server 500 and stored in the hotel server 500.

Specifically, the introduction screen SC12 as illustrated in FIG. 12 is displayed in the display device of the reception counter. That is, as illustrated in FIG. 12, the introduction screen SC12 visually displays the programs (packages A, B, and the like) registered in advance in the hotel server 500 as the rolling program candidates, and a plurality of privileges SF1, SF2, and the like are set in each of the packages. The privilege is awarded to the member when the member purchases the game value dedicated to the rolling program (first game value V1) and the purchased game value is used up within the predetermined period (Validity Days) after the start of the rolling program. For example, four privileges SF1, SF2, SF3, and SF4 are set in the package A, and three privileges SF1, SF2, and SF3 are set in the package B. The privileges are set in response to the setting contents of the input items I13 to I15 (setting items of the privileges to be awarded to the member when the first game value is used up within the period) on the setting screen SC11 illustrated in FIG. 11. The packages (package A, package B, and the like) are configured to be classified in response to the combination of the privileges SF1 to SF4.

A plurality of selection options of an initial chip purchase amount (purchase amount for purchasing the game value for the rolling program) are prepared in each package. For example, in the package A illustrated in FIG. 12, the purchase amounts of 500,000 PHP (Philippine Peso), 1,000,000 PHP, 2,000,000 PHP, and 5,000,000 PHP are prepared as the selection option. The validity period (Validity Days) is determined for each purchase amount. A ratio (rebate) of a credit amount to be returned to the member as the privilege when the purchase amount is used up in the slot machine 1010 within the validity period (Validity Days) set for each purchase amount is determined.

For example, in the package B illustrated in FIG. 12, the purchase amounts of 500,000 PHP, 1,000,000 PHP, 2,000,000 PHP, and 5,000,000 PHP are prepared as the selection option, and the validity period (Validity Days) is determined for each purchase amount. The ratio (rebate) of the credit amount to be returned to the member as the privilege when the purchase amount is used up in the slot machine 1010 within the validity period (Validity Days) set for each purchase amount is determined.

The member can decide which package to select and the purchase amount of the selected package based upon the validity period (Validity Days) associated with each purchase amount and the information on the rebate by checking the introduction screen SC12 illustrated in FIG. 12. When the member informs the staff in charge about the package name and the purchase amount with respect to the desired rolling program at the reception counter, the staff in charge selects any one of the plurality of candidates registered in advance by operating the reception terminal device, and registration is performed in association with the information (member number, and the like) stored in the member information card presented by the member. The registration information is transmitted from the reception terminal device to the hotel server 500, and then stored in the hotel server 500.

In the embodiment, the setting screen SC11 illustrated in FIG. 11 is configured to set the holding period (Slot program duration date and time) during which the rolling program is held, the rolling program outside the period is not displayed on the introduction screen SC12 illustrated in FIG. 12, but for example, the rolling program candidates within the period and the rolling program candidates outside the period may be displayed to be distinguished therebetween by changing a display color and luminance of the package display of the rolling program to be the candidates.

[Change Processing of Rolling Program]

Figure 13:
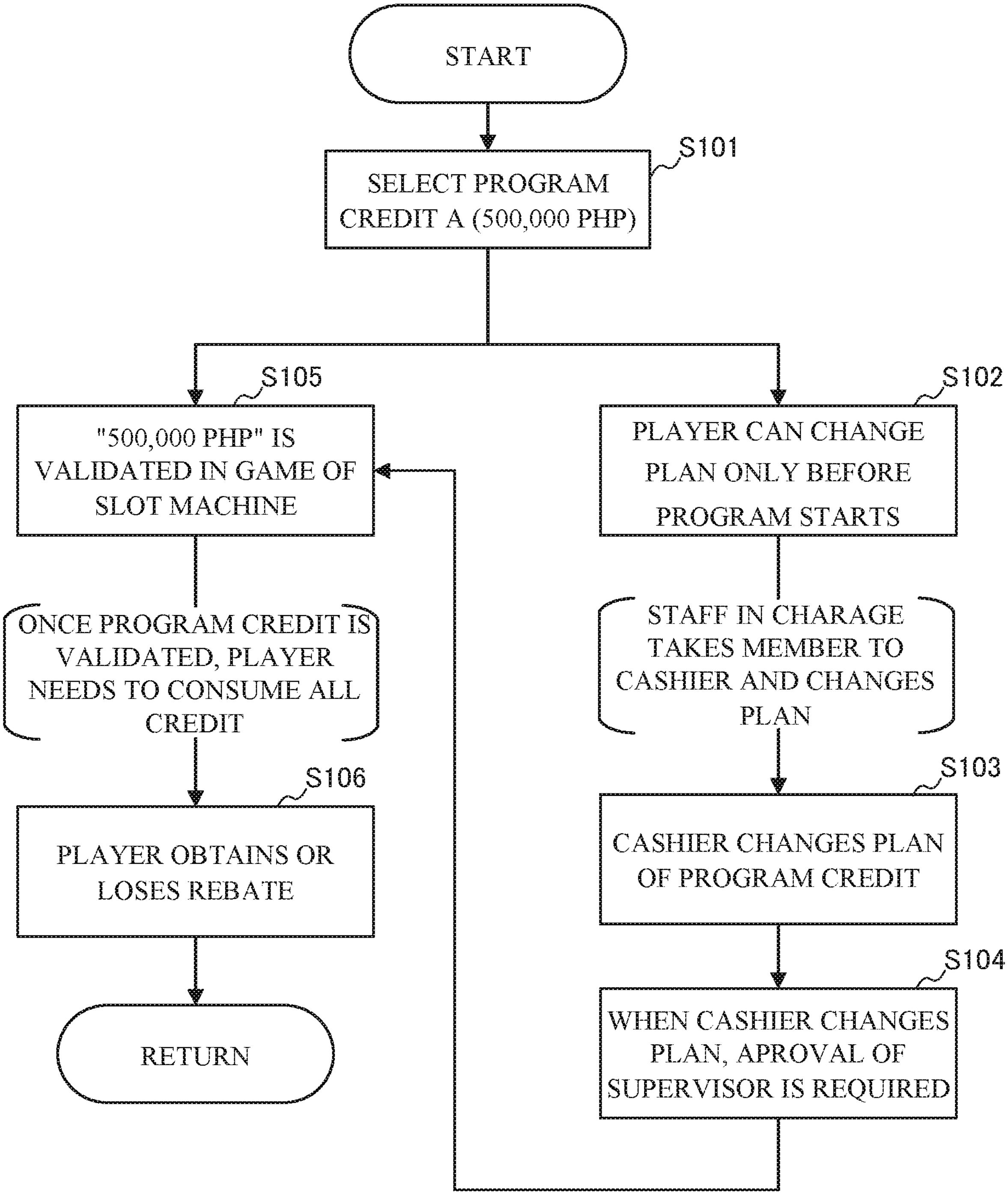
FIG. 13 is a flowchart illustrating a flow of processing before and after the start of the rolling program in the casino system according to the embodiment of the present invention.

FIG. 13 is a flowchart illustrating a flow of processing before and after the start of the rolling program in the casino system 100. The member or the staff in charge who receives a request of the member performs the selection operation on a selection screen for selecting the rolling program displayed on the display device of the reception terminal device (not illustrated) connected to the hotel server 500, whereby it is possible to select any one of the rolling programs. A plurality of types of the rolling programs are prepared in advance according to the combination of the purchase amount and the privilege to be awarded, and the member can select any one of the plurality of rolling programs.

As illustrated in FIG. 13, for example, when the member selects and purchases the rolling program (Program Credit A (purchase amount in the package A illustrated in FIG. 12) program specified by 500,000 PHP) to be specified by the purchase amount of "500,000 PHP (Philippine Peso)" in the reception terminal device (S101), the reception terminal device transmits program information of the selected rolling program to the hotel server 500 in association with the member information (member name, member number, and the like). Specifically, when the member selects the rolling program in the reception terminal device, the reception terminal device receives the member information card owned by the member and reads the specific information (member name, member number, and the like) of the member stored in the member information card, whereby the selected program information and the member information are associated with each other and transmitted to the hotel server 500.

The hotel server 500 stores the selected program information in association with the member on the condition that the purchase amount is paid based upon the information transmitted from the reception terminal device. That is, the rolling program designated by the program information is registered in the account of the member.

In the purchase processing, the reception terminal device stores the program information (purchase amount, program number, and the like) for specifying the rolling program purchased by the member in the received member information card, and then delivers the member information card to the member.

As such, when the member purchases the rolling program, the member can play a game using the dedicated credit purchased by the rolling program by inserting the member information card into the slot machine 1010.

When the credit dedicated to the rolling program purchased in the slot machine 1010 is used for the first time, the program information on the rolling program is transmitted from the slot machine 1010 to the hotel server 500, such that the rolling program is updated to an active state in the hotel server 500 (S105). In the rolling program, when the purchased dedicated credit starts to be used, the rolling program is managed as the active state, and thereafter, the member cannot change the contents of the rolling program purchased once.

That is, when the member purchases the rolling program and registers the purchased rolling program in the account of the member (S101), the hotel server 500 monitors whether the credit dedicated to the rolling program starts to be used, and permits the change of the contents of the rolling program until the credit starts to be used, and on the other hand, after the credit starts to be used, it is determined that the change of the contents of the rolling program is not permitted.

Specifically, the hotel server 500 determines whether the registered rolling program is in the active state. The active state means a state in which the member purchasing the rolling program inserts the member information card, in which the program information of the selected rolling program is stored, into the slot machine 1010, thereby starting the rolling program. That is, the slot machine 1010 into which the member information card is inserted reads the program information from the inserted member information card and transmits the contents thereof to the hotel server 500 together with the member information for specifying the member. The hotel server 500 updates the rolling program of the account of the member to the active state based upon the member information and the program information transmitted from the slot machine 1010.

When the rolling program is not in the active state, the hotel server 500 is in a management state in which the member is permitted to change the contents (plan) of the rolling program only before the start of the rolling program (S102). That is, until the rolling program is started, the contents of the rolling program once purchased can be changed in response to the request of the member. Here, the staff in charge in the casino receives the request from the member, takes the member to the cashier 600 (or reception terminal device), and performs processing of changing the purchased rolling program. The cashier 600 (or reception terminal device) updates the member account being associated with the member in response to a change operation of the member or the staff in charge. Accordingly, the cashier 600 (or reception terminal device) can change the contents (plan) of the program credit (S103).

When the program credit plan is changed in the cashier 600 (reception terminal device), the approval of a supervisor is required (S104).

On the other hand, in a state where the rolling program is not in the active state, when the member inserts the member information card into the slot machine 1010, the slot machine 1010 reads the member information and the program information related to the rolling program from the inserted member information card, and then transmits the read member information and program information to the hotel server 500. The hotel server 500 receiving the pieces of information updates the rolling program stored in the account of the member to the active state based upon the received information (S105). By being in the active state, the history of the rolling program stored in the member account is configured to be updated in response to a usage state of the credit dedicated to the rolling program in the slot machine 1010. As such, the rolling program causes the amount of dedicated credit (for example, "500,000 PHP (Philippine Peso)" purchased in the rolling program to be in the active state.

Once the program credit is validated (S105), the player (member) is required to consume all the dedicated credits purchased for the rolling program. When all the dedicated credits are consumed during the period (Validity Days) determined for each rolling program, the member achieves the condition for receiving the rebate determined for each rolling program. On the other hand, when all the dedicated credits could not be consumed within the period, the member loses the right to receive the rebate (S106). The dedicated credits that could not be consumed are converted into other points, and the like.

By the processing described above, the member can participate in the game by the rolling program by using the purchased dedicated credit.

Other Embodiments

FIGS. 14 to 17 are image diagrams illustrating other embodiments related to the setting of the rolling program.

Figure 14:
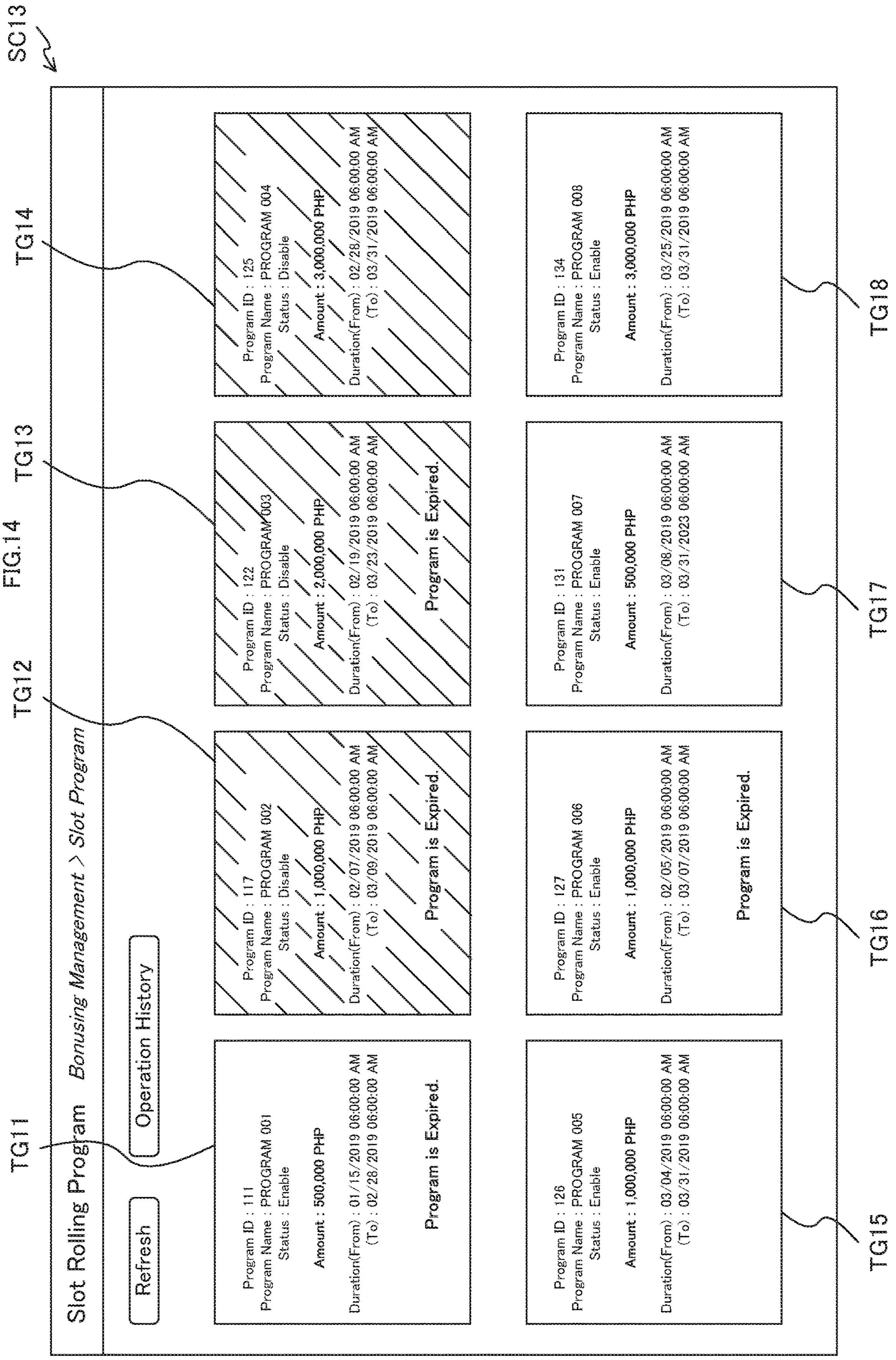
FIG. 14 is a diagram illustrating a selection screen SC13 according to another embodiment.

FIG. 14 is a diagram illustrating a display example of the display device of the reception terminal device (not illustrated) of the hotel server 500. As illustrated in FIG. 14, in the display device of the reception terminal device, a plurality of candidates of the rolling program generated in the hotel server 500 can be displayed on one selection screen SC13 as tags TG11 to TG18. The staff in charge can select the rolling program to be provided to the member by designating any one of the tags TG11 to TG18.

Specifically, as illustrated in FIG. 14, for example, in the rolling program designated by the tag TG11, the program ID is "111"; the program name is "PROGRAM001"; the status indicating whether or not to award a separately set point is "Enable"; the amount is "500,000 PHP (Philippine Peso)"; the period (Duration) during which the rolling program is held is from 6 a.m. on Jan. 15, 2019 to 6 a.m. on Feb. 28, 2019; and the contents can be grasped by the display of the tag TG 11. When the rolling program designated by the tag TG11 is currently selectable (that is, when the status is set to "Enable"), the tag TG11 is displayed in white (FIG. 14), whereas in the case of a tag (for example, the tag TG12) in which the status is set to "Disable" and the rolling program cannot be currently selected, the tag is displayed in gray (illustrated by a diagonal line in FIG. 14). When the current date and time is outside the holding period, the tag TG11 has a mark of "Program is Expired" indicating that the current date and time is outside the holding period and thus the rolling program cannot be selected. The meaning of each item (program ID, program name, status, amount, and period) is the same as that of each item in the embodiment described above in FIGS. 11 and 12.

In the rolling program designated by the tag TG12 in FIG. 14, the program ID is "117"; the program name is "PROGRAM002"; the status is "Disable"; the amount is "1,000,000 PHP (Philippine Peso)"; the period (Duration) during which the rolling program is held is from 6 a.m. on Feb. 7, 2019 to 6 a.m. on Mar. 9, 2019; and the contents can be grasped by the display of the tag TG12. The color of the tag TG12 is displayed in gray in response to a fact that the rolling program designated by the tag TG12 is currently not selectable (that is, in response to a fact that the status is set to "Disable"). Since the current date and time is outside the holding period, the tag TG12 has a mark of "Program is Expired" indicating that the date and time is outside the period and thus the rolling program cannot be selected.

In the rolling program designated by the tag TG13 in FIG. 14, the program ID is "122"; the program name is "PROGRAM003"; the status is "Disable"; the amount is "2,000,000 PHP (Philippine Peso)"; the period (Duration) during which the rolling program is held is from 6 a.m. on Feb. 19, 2019 to 6 a.m. on Mar. 23, 2019; and the contents can be grasped by the display of the tag TG13. The color of the tag TG13 is displayed in gray in response to a fact that the rolling program designated by the tag TG13 is currently not selectable (that is, in response to a fact that the status is set to "Disable"). Since the current date and time is outside the holding period, the tag TG13 has a mark of "Program is Expired" indicating that the date and time is outside the period and thus the rolling program cannot be selected.

In the rolling program designated by the tag TG14 in FIG. 14, the program ID is "125"; the program name is "PROGRAM004"; the status is "Disable"; the amount is "3,000,000 PHP (Philippine Peso)"; the period (Duration) during which the rolling program is held is from 6 a.m. on Feb. 28, 2019 to 6 a.m. on Mar. 31, 2019; and the contents can be grasped by the display of the tag TG14. The color of the tag TG14 is displayed in gray in response to a fact that the rolling program designated by the tag TG14 is currently not selectable (that is, in response to a fact that the status is set to "Disable"). Since the current date and time is within the holding period, the tag TG14 does not have a mark of "Program is Expired" indicating that the date and time is outside the period and thus the rolling program cannot be selected.

In the rolling program designated by the tag TG15 in FIG. 14, the program ID is "126"; the program name is "PROGRAM005"; the status is "Eable"; the amount is "1,000,000 PHP (Philippine Peso)"; the period (Duration) during which the rolling program is held is from 6 a.m. on Mar. 4, 2019 to 6 a.m. on Mar. 31, 2019; and the contents can be grasped by the display of the tag TG15. The color of the tag TG15 is displayed in white in response to a fact that the rolling program designated by the tag TG15 is currently selectable (that is, in response to a fact that the status is set to "Eable"). Since the current date and time is within the holding period, the tag TG15 does not have a mark of "Program is Expired" indicating that the date and time is outside the period.

In the rolling program designated by the tag TG16 in FIG. 14, the program ID is "127"; the program name is "PROGRAM006"; the status is "Eable"; the amount is "1,000,000 PHP (Philippine Peso)"; the period (Duration) during which the rolling program is held is from 6 a.m. on Feb. 5, 2019 to 6 a.m. on Mar. 7, 2019; and the contents can be grasped by the display of the tag TG16. The color of the tag TG16 is displayed in white in response to a fact that the rolling program designated by the tag TG16 is currently selectable (that is, in response to a fact that the status is set to "Eable"). Since the current date and time is outside the holding period, the tag TG16 has a mark of "Program is Expired" indicating that the date and time is outside the period and thus the rolling program cannot be selected.

In the rolling program designated by the tag TG17 in FIG. 14, the program ID is "131"; the program name is "PROGRAM007"; the status is "Eable"; the amount is "500,000 PHP (Philippine Peso)"; the period (Duration) during which the rolling program is held is from 6 a.m. on Mar. 8, 2019 to 6 a.m. on Mar. 31, 2019; and the contents can be grasped by the display of the tag TG17. The color of the tag TG17 is displayed in white in response to a fact that the rolling program designated by the tag TG17 is currently selectable (that is, in response to a fact that the status is set to "Eable"). Since the current date and time is within the holding period, the tag TG17 does not have a mark of "Program is Expired" indicating that the date and time is outside the period.

In the rolling program designated by the tag TG18 in FIG. 14, the program ID is "134"; the program name is "PROGRAM008"; the status is "Eable"; the amount is "3,000,000 PHP (Philippine Peso)"; the period (Duration) during which the rolling program is held is from 6 a.m. on Feb. 25, 2019 to 6 a.m. on Mar. 31, 2019; and the contents can be grasped by the display of the tag TG18. The color of the tag TG18 is displayed in white in response to a fact that the rolling program designated by the tag TG18 is currently selectable (that is, in response to a fact that the status is set to "Eable"). Since the current date and time is within the holding period, the tag TG18 does not have a mark of "Program is Expired" indicating that the date and time is outside the period.

As described above, in the reception terminal device, a plurality of rolling program candidates are displayed by a plurality of tags (for example, tags TG11 to TG18), and the staff in charge can select and operate one or plurality of the rolling programs according to the member's desire. During the selection operation, the staff in charge can register the usage of the rolling program selected in association with the member by inputting the member information such as the member number, and the like into the reception terminal device by using the member information card presented by the member.

Figure 15:
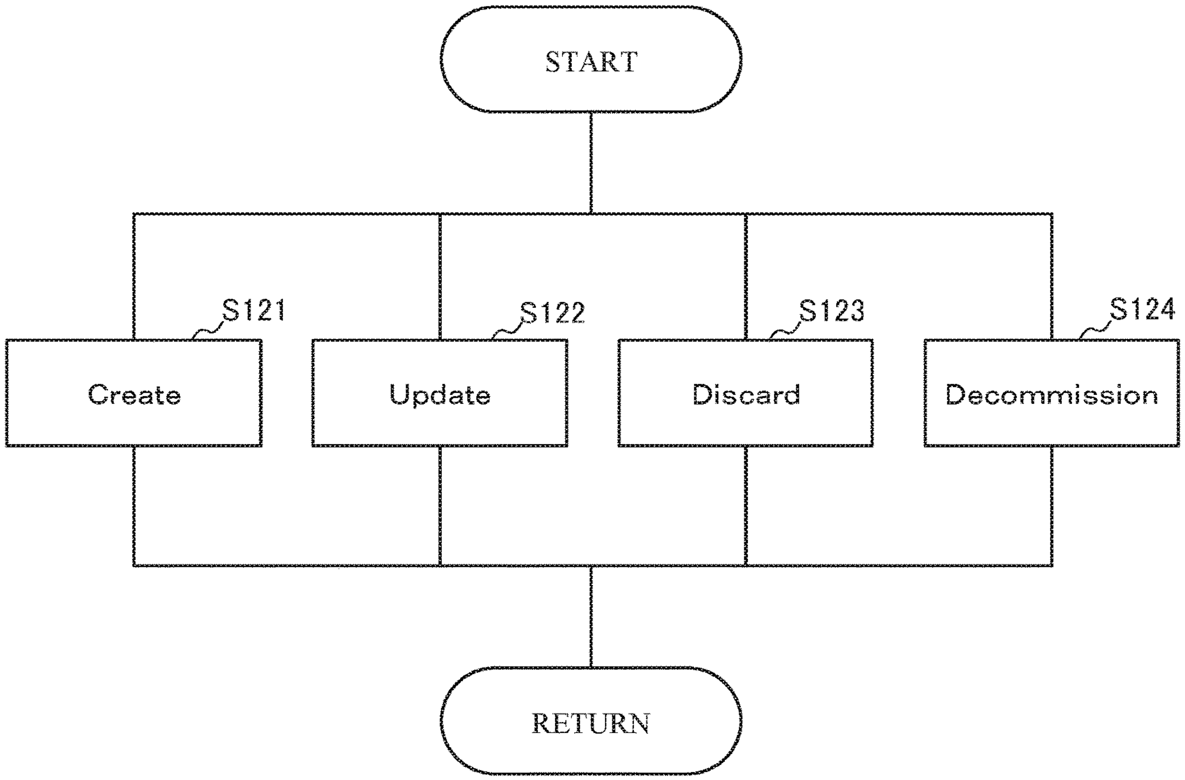
FIG. 15 is a flowchart provided for illustrating various processing with respect to a rolling program according to another embodiment.

In a state where the plurality of rolling programs are set in advance as such, as illustrated in FIG. 15, the staff in charge in the casino can execute each processing of new rolling program setting processing (Create) S121, update processing (Update) S122, discard processing (Discard) S123, and decommission processing (Decommission) S124 with respect to the already registered rolling program, or as setting processing of the rolling program to be newly generated.

Figure 16:
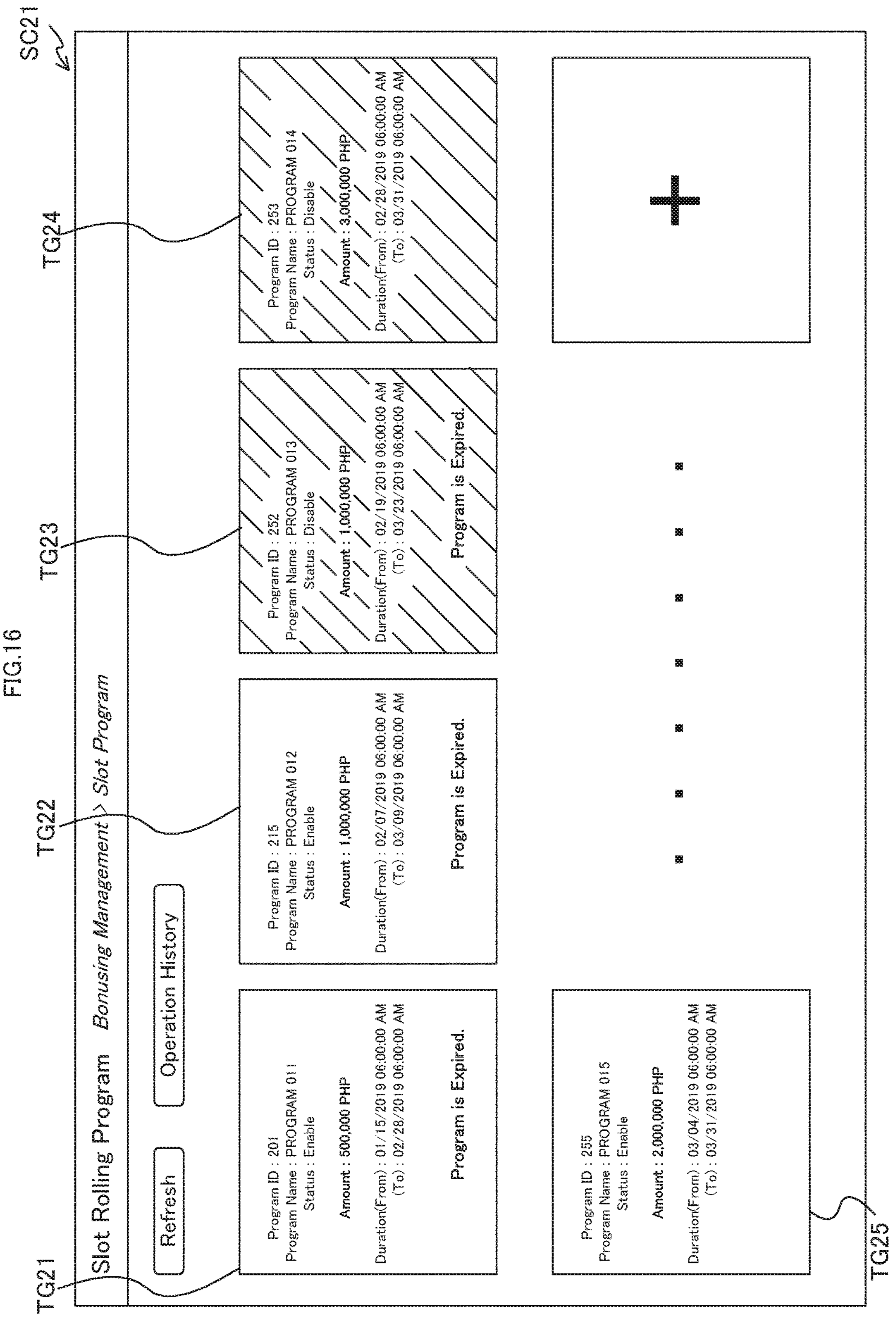
FIG. 16 is a diagram illustrating a selection screen SC21 for various processing with respect to the rolling program according to another embodiment.

Specifically, the hotel server 500 displays a selection screen SC21 of the rolling program illustrated in FIG. 16 in the display device of the reception terminal device. The staff in charge selects any one of the already set rolling programs displayed on the selection screen SC21 or designates the setting of the new rolling program, thereby making it possible to designate various types of processing for the set rolling program.

As illustrated in FIG. 16, in the same manner as the tags TG11 to TG18 illustrated in FIG. 14, in the display device of the hotel server 500, the plurality of rolling programs set here are individually displayed with tags 21, TG22, and the like as the selection screen SC21 of the rolling program. The staff in charge can select the rolling program to perform various types of processing by designating any one of the tags TG21, TG22, and the like.

When one of the rolling programs to be processed is selected from the tags TG21, TG22, and the like illustrated in FIG. 16, the display device displays the already set contents of the selected rolling program and selectable processing items (update processing, discard processing, decommission processing, and the like) as an item display screen (not illustrated). In the item display screen, the set contents of each setting item illustrated in FIG. 11 ("program Name", "Amount", "Commission", "Validity Days", "Duration", and the like) are displayed, and the past processing history is displayed. In the processing history, the date and time of occurrence of processing, the processing contents (setting processing, update processing, discard processing, decommission processing, and the like), the name of the staff in charge who executes the processing, the reason for executing the processing, and the like are displayed.

The staff in charge selects and operates a desired item from among a plurality of items displayed as the item display screen, thereby executing the selected processing with respect to the rolling program. Since the "setting processing (Create)" among the selectable items is an item for newly setting the rolling program, when the item is selected and operated, the hotel server 500 displays the screen (FIG. 11) for setting the rolling program in the display device. The staff in charge can input a plurality of setting items via the screen. The setting items are the same as the setting items described above in FIG. 11.

When the staff in charge selects and operates the item "update processing (Update)" on the item display screen displayed on the display screen of the reception terminal device of the hotel server 500, the hotel server 500 displays a screen for updating the registered rolling program in the display device. The staff in charge can perform the processing for updating the contents of the registered rolling program via the display screen. The update item selectively updates any one of the above-described setting items in FIG. 11, and for example, in a case where the "Amount" already registered is 100,000 PHP, when 100,000 PHP is inputted to the "Amount" as the update item, 100,000 PHP inputted in the update is added to the previous "Amount" 100,000 PHP, such that a total of 200,000 PHP is registered as the "Amount" of the rolling program. That is, the purchase amount of the rolling program can be additionally updated as post-processing. Such update processing can be executed in the same manner even in each setting item other than the "Amount".

When the staff in charge selects the item "discard processing (Discard)" on the item display screen displayed on the display screen of the reception terminal device of the hotel server 500, the hotel server 500 displays a screen for discarding the rolling program registered in the display device. The staff in charge can perform the processing for discarding the selected registered rolling program via the display screen. Incidentally, the discard processing can be executed only for a program whose item "status" is "Disable".

When the staff in charge selects the item "Decommission processing (Decommision)" on the item display screen displayed on the display screen of the reception terminal device of the hotel server 500, the hotel server 500 displays a screen for decommissioning the rolling program registered in the display device. The staff in charge can perform the processing for decommissioning the selected registered rolling program via the display screen. Incidentally, the decommission processing can be executed only for the rolling program whose current date and time is outside the period (Duration) during which the rolling program is held illustrated in FIG. 11 and whose mark is "Program is Expired".

Figure 17:
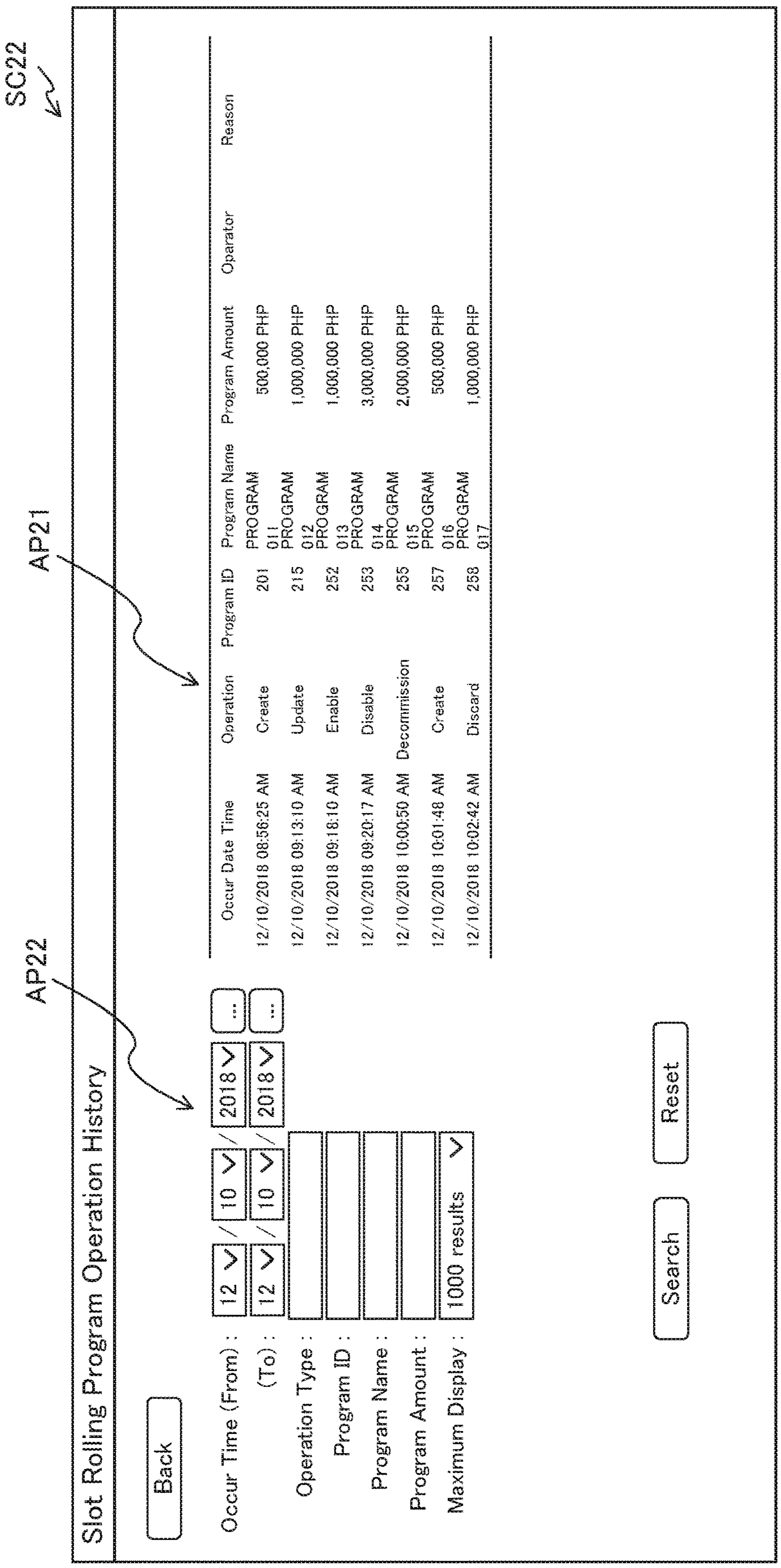
FIG. 17 is a diagram illustrating a display example of an execution history of various processing with respect to the rolling program.

FIG. 17 is a diagram illustrating a display example when the execution history of the various processing described above for the set rolling program is displayed on the display device of the reception terminal device. As illustrated in FIG. 17, on the execution history display screen SC22, the date and time of processing occurrence, the processing contents (setting processing, update processing, discard processing, decommission processing, and the like), the program ID of the rolling program that is processed, the name of the program, the amount of the program, the name of the staff in charge who executes the processing, the reason for executing the processing, and the like are displayed in a detail display part AP21.

On the execution history display screen SC22, a designation part AP22 for designating a processing execution period to be displayed as a history is provided, and the staff in charge can designate the period during which the processing to be displayed as a history occurs via the designation part AP22. The history related to the processing is stored in the storage part of the hotel server 500, and in response to the request of the history display, the history is read from the storage part and displayed on the display device.

As described above, the casino system 100 can execute the processing of changing the purchase amount, and the like with respect to the rolling program once prepared.

The display device for displaying the display screens illustrated in FIGS. 14 to 17 is not limited to the display device of the reception terminal device, but can be the display device of the hotel server 500, and the like, in short, a variety of devices can be applied as long as the display device is connected to a device that stores the member account and the setting contents of the rolling program.

While the embodiment of the present invention is described, the embodiment thereof is merely described with a specific example and does not particularly limit the present invention, and a specific configuration of each device, and the like can be appropriately changed in design. The effects described in the embodiment of the present invention are those merely enumerating the most suitable effects resulting from the present invention, and the effects of the present invention are not limited to those described in embodiment of the present invention.

In the above-described detailed descriptions, a characteristic part is mainly described so as to more easily understand the present invention. The present invention is not limited to the embodiment described in the detailed descriptions, but can be also applied to other embodiments and the scope of application thereof is varied. The terminology and the phase used in the present specification are used to accurately describe the present invention, and are not used to limit the interpretation of the present invention. It may be easy for those skilled in the art to reconsider other configurations, systems, methods, and the like included in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the literatures already disclosed are interpreted with due consideration.

The above-described detailed descriptions include the processing executed by a computer. The above descriptions and expressions are intended to help those skilled in the art to understand most efficiently. In the present specification, each step used to derive one result should be understood as processing that is not self-contradictory. In each step, transmission and reception, recording, and the like of an electrical or magnetic signal are performed. In the processing in each step, while such a signal is represented with bits, values, symbols, characters, terms, numbers, and the like, it should be noted that these are merely used for the convenience of the descriptions. While the processing in each step may be described with expressions common to human behavior, the processing described in the present specification is basically performed by various devices. Other configurations required for performing each step become obvious from the above descriptions.

REFERENCE SIGNS LIST

100: casino system
500: hotel server
600: cashier
601: device for issuing game chip
1010A, 1010B: slot machine
1500: IC card
1600: game chip
1700: PTS terminal
2010A, 2010B: game table

The invention claimed is:

1. A game system comprising a gaming machine configured to play a game in response to an inserted game value;

an information processing device connected to the gaming machine and configured to communicate with the gaming machine;

a player information storage device configured to player information of a player; and a management device configured to communicate with the player information storage device, wherein the information processing device is configured to:

receive game value information that can be used in the game from the player information stored in the player information storage device;

provide the game value information to the game; and transmit information corresponding to a result of using the game value information in the game to the player information storage device, and wherein the management device is configured to:

set an amount and validity date of a game value corresponding to the game value information of the player information stored in the player information storage device;

determine whether the amount of the game value is exhausted within the validity date according to providing the game value information to the game; and transmit privilege information to the player information stored in the player information storage device when determining that the amount of the game value is exhausted within the validity date.

2. The game system of claim 1, wherein the management device is configured to cause the player to lose a right to acquire the privilege information when determining that the amount of the game value is not exhausted within the validity date.

3. The game system of claim 2, wherein the management device is configured to convert a remaining amount that is not used in the amount of the game value within the validity date into a point.

4. The game system of claim 1, wherein the management device is configured to set a plurality of packages and cause the player to purchase a package from among the plurality of packages, and wherein the game value information is provided by the package purchased by the player.

5. The game system of claim 4, wherein each of the plurality of packages includes, as contents, at least one of a plurality of amounts, at least one of a plurality of validity dates, and at least one of a plurality of privileges for the privilege information.

6. The game system of claim 5, wherein the management device is configured to permit the player to change the contents of the purchased package before the game value corresponding to the game value information is used.

7. The game system of claim 5, wherein the management device is configured to prohibit the player from changing the contents of the purchased package after the game value corresponding to the game value information is used.

8. The game system of claim 1, wherein the privilege information includes at least one of a cash, a credit, a point, a prize, and preferential treatment.

9. An operation method of a game system, comprising setting an amount and validity date of a game value corresponding to the game value information included in player information stored in a player information storage device;

receiving the game value information from the player information stored in the player information storage device;

providing the game value information to the game;

transmitting information corresponding to a result of using the game value information in the game to the player information storage device;

determining whether the amount of the game value is exhausted within the validity date according to providing the game value information to the game; and transmitting privilege information to the player information stored in the player information storage device when determining that the amount of the game value is exhausted within the validity date.

10. The operation method of claim 9, further comprising causing the player to lose a right to acquire the privilege information when determining that the amount of the game value is not used within the validity date.

11. The operation method of claim 10, further comprising converting a remaining amount that is not used in the amount of the game value within the validity date into a point.

12. The operation method of claim 9, further comprising:

setting a plurality of packages; and causing the player to purchase a package from among the plurality of packages, wherein the game value information is provided by the package purchased by the player.

13. The operation method of claim 12, wherein each of the plurality of packages includes, as contents, at least one of a plurality of amounts, at least one of a plurality of validity dates, and at least one of a plurality of privileges for the privilege information.

14. The operation method of claim 13, further comprising permitting the player to change the contents of the purchased package before the game value corresponding to the game value information is used.

15. The operation method of claim 13, further comprising prohibiting the player from changing the contents of the purchased package after the game value corresponding to the game value information is used.

16. The operation method of claim 9, wherein the privilege information includes at least one of a cash, a credit, a point, a prize, and preferential treatment.

* * * * *